US011892888B2

(12) United States Patent
Kim et al.

(10) Patent No.: US 11,892,888 B2
(45) Date of Patent: Feb. 6, 2024

(54) ELECTRONIC APPARATUS FOR SUPPLYING POWER TO AN EXTERNAL DEVICE CONNECTED TO AN OUTPUT PORT FROM MULTIPLE INPUT PORTS AND CONTROL METHOD THEREOF

(71) Applicant: SAMSUNG ELECTRONICS CO., LTD., Suwon-si (KR)

(72) Inventors: Moonyoung Kim, Suwon-si (KR); Jeongil Kang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 328 days.

(21) Appl. No.: 17/013,982

(22) Filed: Sep. 8, 2020

(65) Prior Publication Data
US 2021/0072808 A1    Mar. 11, 2021

(30) Foreign Application Priority Data

Sep. 11, 2019 (KR) .......................... 10-2019-0112906

(51) Int. Cl.
*G06F 1/26* (2006.01)
*H02J 50/80* (2016.01)
(Continued)

(52) U.S. Cl.
CPC ................ *G06F 1/266* (2013.01); *G06F 1/28* (2013.01); *G06F 1/3215* (2013.01); *H02J 50/12* (2016.02);
(Continued)

(58) Field of Classification Search
CPC .......... G06F 1/266; G06F 1/28; G06F 1/3215; G06F 2200/261; G06F 1/263; H02J 50/12;
(Continued)

(56) References Cited

U.S. PATENT DOCUMENTS 6,178,514 B1   1/2001  Wood
9,307,621 B1 *  4/2016  Parello ................... H05B 45/10
(Continued)

FOREIGN PATENT DOCUMENTS

CN      107408891 A    11/2017
JP      2010161828 A    7/2010
(Continued)

OTHER PUBLICATIONS

International Search Report (PCT/ISA/210) and Written Opinion (PCT/ISA/237) dated Dec. 17, 2020 issued by the International Searching Authority in International Application No. PCT/KR2020/011413.
(Continued)

*Primary Examiner* — Danny Chan
(74) *Attorney, Agent, or Firm* — Sughrue Mion, PLLC

(57) ABSTRACT

An electronic apparatus includes: a plurality of input ports to which a plurality of first external devices are connected; a converter; an output port to which a second external device is connected; and a processor that controls the converter to convert a plurality of input voltages of the plurality of first external devices connected to the plurality of input ports into an output voltage, identifies whether power is capable of being supplied by each of the input voltages, and controls the converter to output the converted output voltage to the second external device to the output port, based on whether the power is capable of being supplied.

17 Claims, 14 Drawing Sheets

(51) Int. Cl.
   *H02J 50/12* (2016.01)
   *G06F 1/28* (2006.01)
   *G06F 1/3215* (2019.01)

(52) U.S. Cl.
   CPC ........ *H02J 50/80* (2016.02); *G06F 2200/261* (2013.01); *H02J 2207/30* (2020.01)

(58) Field of Classification Search
   CPC ........ H02J 50/80; H02J 2207/30; H02J 50/10; H01J 1/00; H02M 3/1584
   See application file for complete search history.

(56) References Cited

U.S. PATENT DOCUMENTS

| | | | |
|---|---|---|---|
| 10,222,402 B2 | 3/2019 | Varsha et al. | |
| 11,334,135 B1* | 5/2022 | Wang | G06F 1/263 |
| 2008/0005602 A1* | 1/2008 | Diab | G06F 1/266 |
| | | | 713/300 |
| 2008/0222432 A1 | 9/2008 | Gilbert | |
| 2011/0199060 A1* | 8/2011 | Sriram | H02M 3/33573 |
| | | | 323/234 |
| 2011/0266875 A1 | 11/2011 | Shimura et al. | |
| 2011/0270456 A1 | 11/2011 | Kouda et al. | |
| 2013/0049469 A1* | 2/2013 | Huff | G06F 1/266 |
| | | | 307/62 |
| 2014/0129855 A1* | 5/2014 | Hamdi | G06F 1/266 |
| | | | 713/320 |
| 2014/0237280 A1* | 8/2014 | Muto | H02M 3/33561 |
| | | | 713/323 |
| 2014/0306528 A1 | 10/2014 | Decesaris et al. | |
| 2015/0054451 A1* | 2/2015 | Rokusek | H02J 7/0013 |
| | | | 320/108 |
| 2015/0214771 A1* | 7/2015 | Peterson | G06F 1/263 |
| | | | 307/20 |
| 2017/0185125 A1 | 6/2017 | Lin | |
| 2018/0019585 A1 | 1/2018 | Koga et al. | |
| 2018/0026441 A1 | 1/2018 | Taufik et al. | |
| 2018/0034321 A1* | 2/2018 | Tole | H02J 50/80 |
| 2018/0045765 A1* | 2/2018 | Borleske | G01R 19/16528 |
| 2018/0097340 A1 | 4/2018 | Lee et al. | |
| 2018/0131283 A1 | 5/2018 | Ono | |
| 2018/0183340 A1 | 6/2018 | Waters | |
| 2018/0335454 A1 | 11/2018 | Varsha et al. | |
| 2019/0004584 A1 | 1/2019 | Nge et al. | |
| 2019/0238706 A1* | 8/2019 | Sakai | H04N 1/00907 |
| 2019/0341786 A1 | 11/2019 | Lee et al. | |
| 2019/0348912 A1* | 11/2019 | Philip | H02M 1/32 |
| 2020/0089296 A1* | 3/2020 | Fossati | G06F 1/263 |
| 2020/0274724 A1* | 8/2020 | Rosenthal | G06F 1/266 |

FOREIGN PATENT DOCUMENTS

| | | |
|---|---|---|
| KR | 101143533 B1 | 5/2012 |
| KR | 1020180092691 A | 8/2018 |
| WO | 2016/030725 A1 | 3/2016 |
| WO | 2018118022 A1 | 6/2018 |

OTHER PUBLICATIONS

Communication dated Feb. 9, 2021 issued by the European Patent Office in application No. 20195543.2.
Communication dated Jul. 8, 2021 by the European Patent Office in counterpart European Patent Application No. 20195543.2.

\* cited by examiner

ELECTRONIC APPARATUS FOR SUPPLYING POWER TO AN EXTERNAL DEVICE CONNECTED TO AN OUTPUT PORT FROM MULTIPLE INPUT PORTS AND CONTROL METHOD THEREOF

CROSS-REFERENCE TO RELATED APPLICATION

This application claims priority from Korean Patent Application No. 10-2019-0112906, filed on Sep. 11, 2019, in the Korean Intellectual Property Office, the disclosure of which is incorporated herein by reference in its entirety.

BACKGROUND

1. Field

Embodiments of the disclosure relate to an electronic apparatus capable of supplying power to an external device connected to an output port, and a control method thereof.

2. Description of Related Art

With the recent technological developments, a general-purpose connector such as a universal serial bus (USB) is attached to many electronic devices, and is used for signal transmission and power supply. However, when supplying power, for example, even a general USB 3.0 has a specification of at most about 0.9 A at a voltage of 5 V, and it is thus impossible to drive a product of 5 W or more using the USB.

Recently, a USB power delivery (USB PD) standard enabling the supply of power up to 100 W has been created through a C-type USB port, but most electronic apparatuses do not yet have the C-type USB port or a block for USB PD. Therefore, in order to use the USB PD standard, the electronic apparatus should support the USB PD, and a C-type cable, a power block and the like are additionally required.

SUMMARY

The embodiments of the disclosure provide an electronic apparatus capable of supplying larger power using a plurality of existing USB ports in a product having the plurality of existing USB ports, such as a television (TV) or a personal computer (PC).

Accordingly, the disclosure may provide an electronic apparatus capable of supplying larger power using an existing port provided in a peripheral device, and a control method thereof.

Moreover, according to embodiments of the disclosure, the electronic apparatus may receive power supplied from a plurality of external devices at input ports thereof and supply power required by another external device to be used to another external device through a converter.

According to an aspect of the disclosure, there is provided an electronic apparatus, comprising: a plurality of input ports, each of the plurality of input ports configured to connect with one or more first external devices; a converter; an output port configured to connect with a second external device; and a processor configured to: control the converter to convert a plurality of input voltages received from the one or more first external devices through the plurality of input ports into an output voltage, identify whether power is capable of being supplied to the second external device by the plurality of input voltages, and control the converter to output the converted output voltage to the second external device connected to the output port, based on identifying that the power is capable of being supplied to the second external device.

The processor may be further configured to: identify a maximum available current from each of the plurality of input ports, and identify whether the power is capable of being supplied to the second external device based on whether a current supplied from each of the plurality of input ports is lower than the maximum available current.

The processor may be further configured to control the converter to change the output voltage to reach a target value by increasing a pulse width of a control signal applied to the converter based on the output voltage being lower than the target value.

The converter may comprise a plurality of sub-converters connected to each other in parallel, each of the plurality of sub-converters corresponding to the plurality of input ports, and the processor may be further configured to perform control to maintain a pulse width of a control signal applied to a first sub-converter, from among the plurality of sub-converters, the first sub-converter corresponding to a input port, from among the plurality of input ports, whose power is expected to exceed maximum available power.

The electronic apparatus may further comprise a display, and the processor may be further configured to control the display to display information on at least one of maximum available power of the one or more first external devices connected to the plurality of input ports, required power of the second external device, or outputtable power of the output port.

The output port may comprise a wireless power transmission circuit, and the processor may be further configured to control the wireless power transmission circuit to wirelessly transmit the power to the second external device.

The electronic apparatus may further comprise a circuit that is provided on the output port and configured to identify a required voltage of the second external device, wherein the processor may be further configured to control the converter to reach the output voltage to the identified required voltage.

The processor may be further configured to identify a magnitude of the plurality of input voltages to be increased based on supply of the power being insufficient, and the electronic apparatus may further comprise a circuit that requests the one or first external devices to increase one or more of the plurality of input voltages to reach the identified magnitude.

Each of the plurality of input ports may be a universe serial bus (USB) port.

The converter may comprise a plurality of sub-converters whose respective input terminals are correspondingly connected to the plurality of input ports and respective output terminals are connected to each other in series.

According to another aspect of the disclosure, there is provided a method of controlling an electronic apparatus, comprising: identifying whether power is capable of being supplied by a plurality of input voltages from one or more first external devices connected to a plurality of input ports; and controlling a converter to output an output voltage converted from the plurality of input voltages to a second external device connected to an output port, based on identifying that the power is capable of being supplied.

The identifying of whether the power is capable of being supplied may include: identifying a maximum available current from each of the plurality of input ports, and identifying whether the power is capable of being supplied to the second external device based on whether a current supplied from each of the plurality of plurality of input ports is lower than the maximum available current.

The converter may include a plurality of sub-converters connected to each other in parallel, each of the plurality of sub-converters corresponding to the plurality of input ports, wherein the controlling further comprises: controlling the plurality of sub-converters to change the output voltage to reach a target value by increasing a pulse width of a control signal applied to the converter based on the output voltage being lower than the target value; and performing control to maintain a pulse width of a control signal applied to a first sub-converter, from among the plurality of sub-converters, the first sub-converter corresponding to a input port, from among the plurality of input ports, whose power is expected to exceed maximum available power.

The method may further comprise displaying information on at least one of maximum available power of the plurality of first external devices connected to the plurality of input ports, required power of the second external device, or outputtable power of the output port.

The controlling may further comprise: identifying a required voltage of the second external device; and controlling the converter to reach the output voltage to the identified required voltage.

The method may further comprise identifying a magnitude of the plurality of input voltages to be increased based on the supply of the power being insufficient; and requesting the one or first external devices to increase one or more of the plurality of input voltages to reach the identified magnitude.

According to another aspect of the disclosure, there is provided an apparatus comprising: a memory storing one or more instructions; and a processor configured to: identify whether power is capable of being supplied by a plurality of input voltages from one or more first external devices connected to a plurality of input ports, and control a converter to output an output voltage converted from the plurality of input voltages to a second external device connected to an output port, based on identifying that the power is capable of being supplied.

According to another aspect of the disclosure, there is provided an apparatus comprising: a memory storing one or more instructions; and a processor configured to: identify whether a first external device is connected to a first input port, from among a plurality of input ports; and output a control signal to increase current flowing through a transistor corresponding to the first external device until the current flowing through the transistor reaches a magnitude corresponding to a maximum available current from the first external device through the first input port.

The processor may be further configured to identify the maximum available current by identifying whether a fluctuation is generated in an input voltage from the first external device while gradually increasing a gate voltage of the transistor through the control signal. The processor may be further configured to identify the maximum available current based on rapid drop in the input voltage above a threshold value.

DETAILED DESCRIPTION

Figure 1:
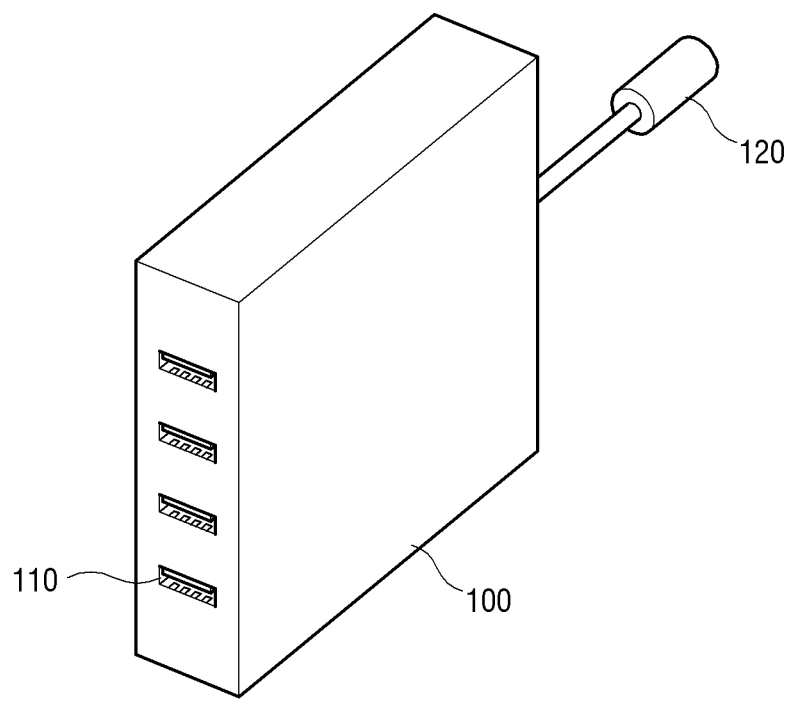
FIG. 1 is an example illustrating an electronic apparatus according to an embodiment of the disclosure.

Hereinafter, embodiments of the disclosure will be described in detail with reference to the accompanying drawings. Throughout the drawings, the same reference numerals denote components that perform substantially the same functions and sizes of respective components may be exaggerated for clarity and convenience of explanation. However, the technical spirit of the disclosure and core components and actions thereof are not limited to components and actions described in the following embodiments. In describing the embodiment of the disclosure, when it is determined that a detailed description for the known technologies or components related to the embodiment of the disclosure may unnecessarily obscure the gist of the disclosure, the detailed description will be omitted.

In some embodiments of the disclosure, terms including ordinal numbers such as first and second are used only for the purpose of distinguishing one component from other components, and singular forms are intended to include plural forms unless the context clearly indicates otherwise. In addition, in some embodiments of the disclosure, it is to be understood that terms 'include' or 'have' do not preclude the presence or addition of one or more other features, numerals, steps, operations, components, parts, or combinations thereof. In some embodiments of the disclosure, a 'module' or a 'unit' may perform at least one function or operation, be implemented by hardware or software or be implemented by a combination of hardware and software, and be implemented to be integrated as at least one module.

In addition, in some embodiments of the disclosure, at least one of a plurality of elements refers to not only all of the plurality of elements, but also each one of the plurality of elements excluding the others of the plurality of elements or a combination thereof.

FIG. 1 is an example illustrating an electronic apparatus according to an embodiment of the disclosure.

According to an embodiment, an electronic apparatus 100 may include a plurality of input ports 110 and one output port 120, as illustrated in FIG. 1.

The input ports 110 may be connected to external devices (hereinafter referred to as 'first external devices'). According to an embodiment, the first external devices having a number corresponding to the number of input ports 110 provided in the electronic apparatus 100 may be connected to the electronic apparatus 100. For example, the first external devices may include various power supply sources such as a computer, a television (TV), a portable terminal, a set-top box, etc., and may be physically connected to the electronic apparatus 100 according to the disclosure through a respective cable or the like, and signals input from the various first external devices to the electronic apparatus 100 may be transmitted to another external device (hereinafter referred to as a 'second external device') connected to the output port 120.

The second external device may include a device, which operates by receiving power supplied from a plurality of first external devices. According to an embodiment, the second external device may be an electronic apparatus that a user wants to use, and may be one of electronic device such as a computer, a TV, a portable terminal, or a set-top box. The second external device may receive power supplied from the electronic apparatus 100 in a wired manner or a wireless manner.

A standard of a signal received at the input port 110 from the first external device may include, for example, a general-purpose connector such as a universal serial bus (USB) connector, but is not limited thereto, and may be applied to other connectors capable of supplying power. The USB connector includes, for example, four pins, that is, two power supply pins used for power supply and two data transmission pins used for data transmission. The four pins of the USB connector are connected to a USB connector of the first external device through four corresponding power supply lines and data transmission lines of a USB cable. When the first external device is connected to the USB connector of the input port 110, power may be supplied from the first external device to the electronic apparatus 100 through the first external device and the power supply pins of the USB connector of the input port 110. Meanwhile, according to an embodiment, data may also be transmitted between the first external device and the electronic apparatus 100 through the first external device and the data transmission pins of the USB connector of the input port 110.

A standard for supplying the power to the second external device through the output port 120 may be configured in various manners in accordance with an implementation form of the apparatus. For example, the power may be supplied to the second external device in a wired manner through a direct current (DC) connector, a USB connector, or the like. A detailed description for the output port 120 supplying the power in a wireless manner will be provided later. A case where the number of output ports 120 is one has been described in the embodiment, but the number of output ports 120 is not limited thereto, and a plurality of output ports may be provided.

Therefore, according an embodiment, the electronic apparatus 100 serves to perform control to collect power from the external devices (e.g., first external devices) connected to the plurality of input ports 110 and supply the power to another external device (e.g., to a second externa device) to be connected to the output port 120 and be used.

Figure 2:
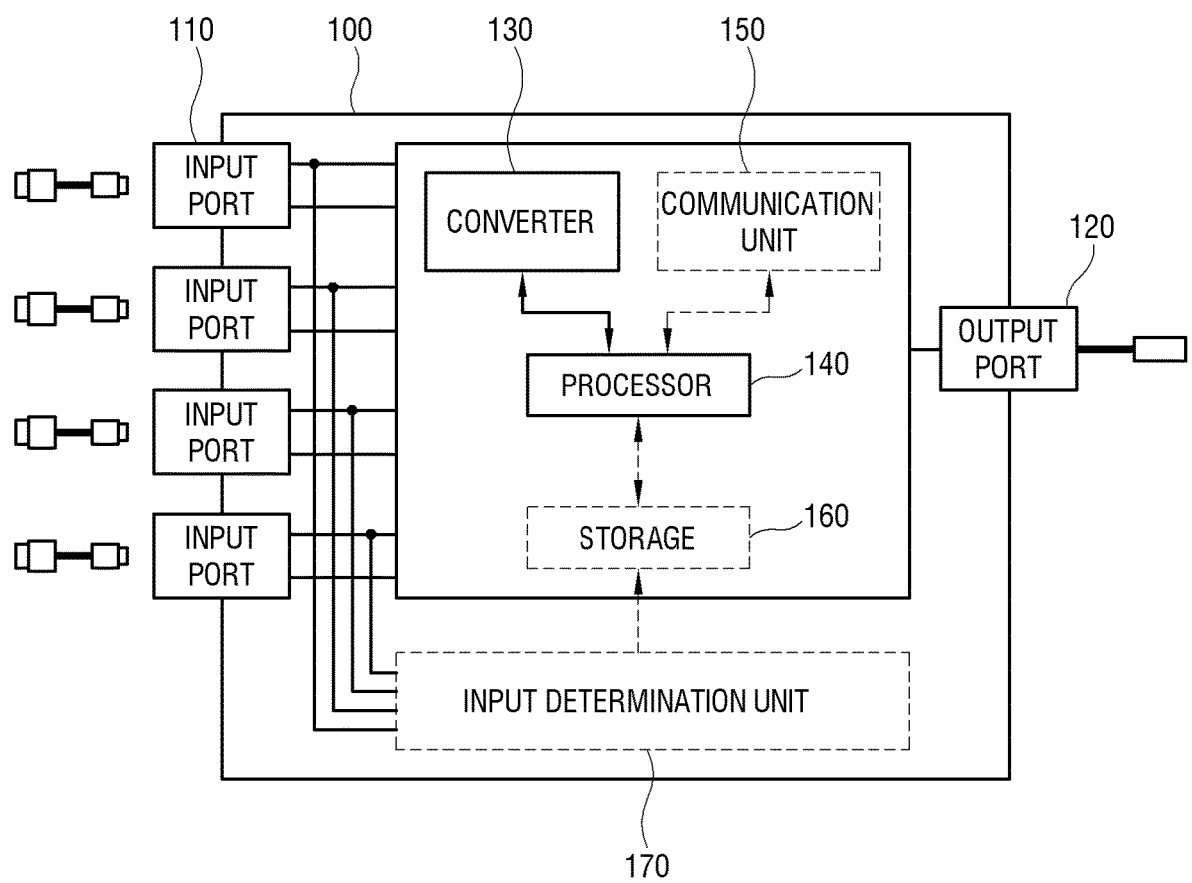
FIG. 2 is a block diagram illustrating components of the electronic apparatus according to an embodiment of the disclosure.

FIG. 2 is a block diagram illustrating components of the electronic apparatus according to an embodiment of the disclosure.

The electronic apparatus 100 according to an embodiment of the disclosure includes the input ports 110, the output port 120, a converter 130, and a processor 140, as illustrated in FIG. 2. According to another embodiment, the electronic apparatus 100 may further include a communication unit 150, a storage 160, and an input determination unit 170.

The components included in the electronic apparatus 100 are not limited by the embodiment described above. That is, some of the components included in the electronic apparatus 100 may be excluded or modified or other components may be further included in the electronic apparatus 100. For example, the electronic apparatus 100 may further include a display 1110 (see FIG. 11) displaying information on power.

Figure 5:
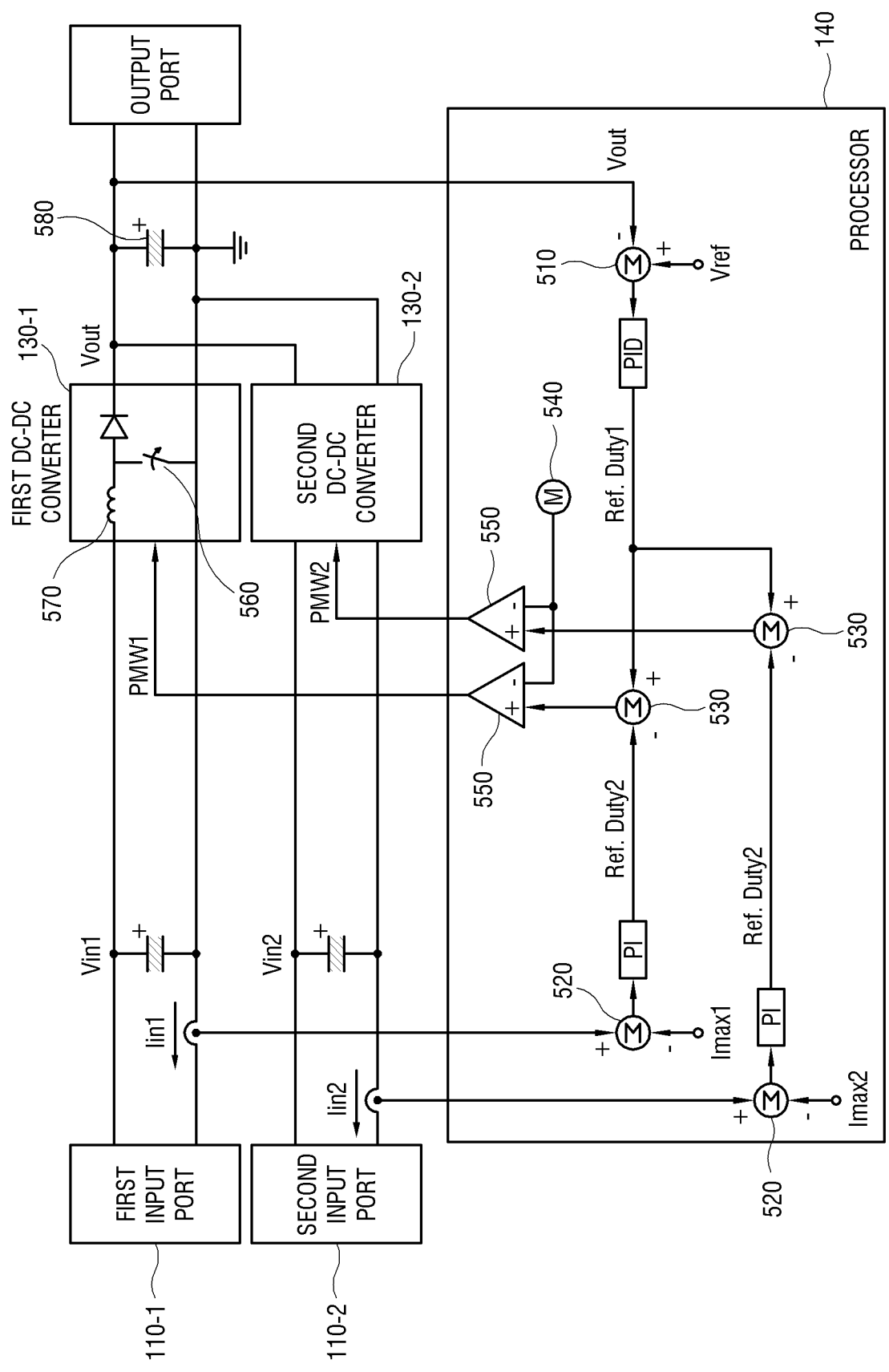
FIG. 5 is a circuit diagram illustrating a converter and a processor of the electronic apparatus according to an embodiment of the disclosure.

According to an embodiment, the converter 130 may be a DC-DC converter. The converter 130 may be implemented by at least one or a combination of a buck converter that steps down (e.g., bucks a voltage), a boost converter that boosts a voltage, or a buck-boost converter. For example, the converter 130 may include an inductor, a capacitor, and a switching element, and may include a transformer instead of the inductor according to a design. The switching element may be implemented by a transistor such as a field effect transistor (FET), and may also be replaced with an element turned on or off by another control signal. For example, a case where a first DC-DC converter is implemented as a boost converter as illustrated in FIG. 5 will be described. While a circuit configuration of only the first DC-DC converter is illustrated in FIG. 5, a second DC-DC converter (or other DC-DC converter) may also have the same or similar circuit configuration as that of the first DC-DC converter. In the first DC-DC converter, when a switching element 560 is turned on by a control signal PWM1, that is, when a switch is closed, an input current Iin1 flows to an inductor 570. In this process, power is stored in the inductor 570. On the other hand, when the switching element 560 is turned off, that is, when the switch is opened, the current Iin1 flows from the inductor 570 to a capacitor 580. In this process, the power stored in the inductor 570 is transferred to the capacitor 580. The power transferred to the capacitor 580 is a direct current (DC) voltage Vout of a voltage level, and may be provided as an operating voltage of a load, that is, the second external device. According to an embodiment, the voltage level may be a predetermined level. In accordance with the same operation principle as that of the first DC-DC converter, power may be transferred to the capacitor 580 also by the second DC-DC converter. According to an embodiment of the disclosure, the converter 130 according may include a plurality of converters (130-1, 130-2, . . . , 130-n, where n is a natural number), each corresponding to each input port (110-1, 110-2, . . . , 110-m, where m is a natural number), and outputs an output voltage whose voltage level is converted to the second external device.

The processor 140 according to an embodiment of the disclosure may perform pulse width modulation (PWM) control in order to control the output voltage of the converter 130. Here, the PWM control refers to a control method of compensating for a fluctuation amount by adjusting a switching period, that is, a duty ratio, of the switching element of the converter 130 by detecting the output voltage and then comparing the output voltage with a reference voltage. A detailed description for the converter 130 according to an embodiment of the disclosure and a control operation of the converter 130 by the processor 140 will be provided later.

The processor 140 may perform general control of the electronic apparatus 100. According to an embodiment, the processor 140 identifies whether power may be supplied by input voltages of the plurality of first external devices connected to each input port 110, and controls the converter 130 so that the output voltage becomes a voltage required by the second external device based on whether the power may be supplied by the input voltages of the plurality of first external devices. In addition, the processor 140 identifies whether the power may be supplied according to whether a current supplied from each of the first external devices is a maximum available current that may be supplied by each of the first external devices. A detailed description for an operation of the processor 140 will be provided later.

The processor 140 includes a control circuit so as to perform the control operation as described above. A detailed description for the control circuit of the processor 140 will be provided later. In addition, the processor 140 may further execute a control program (or instruction) so as to perform such a control operation. In this case, the processor 140 includes at least one general-purpose processor loading at least a part of the control program from a non-volatile memory in which the control program is installed into a volatile memory and executing the loaded control program, and may be implemented by, for example, a central processing unit (CPU), an application processor (AP), or a microprocessor.

The processor 140 may include a single core, a dual core, a triple core, a quad core, or a multiple-number core thereof. The processor 140 may include a plurality of processors, for example, a main processor and a sub processor operating in a sleep mode (for example, a mode in which only standby power is supplied and the electronic apparatus does not operate as the electronic apparatus). In addition, one or more of the plurality of processors, a read only memory (ROM), and a random access memory (RAM) may be interconnected through an internal bus. The processor 140 may be implemented in a form in which it is included in a main system-on-chip (SoC) mounted on a printed circuit board (PCB) embedded in the electronic apparatus 100.

The control program may include a program (programs) implemented in at least one form of a basic input output system (BIOS), a device driver, an operating system, a firmware, a platform, and an application program (application). As an embodiment, the application program may be installed or stored in advance in the electronic apparatus 100 at the time of manufacturing the electronic apparatus 100, or data of the application program may be received from the outside at the time of using the electronic apparatus 100 later and the application program may be installed in the electronic apparatus 100 based on the received data. The data of the application program may be downloaded from an external server such as an application market to the electronic apparatus 100. Such an external server is an example of a computer program product according to an embodiment of the disclosure, but is not limited thereto.

In an embodiment, the operation of the processor 140 may be implemented as a computer program stored in a computer program product provided separately from the electronic apparatus 100. In this case, the computer program product includes a memory in which an instruction corresponding to the computer program is stored and a processor. The instruction performs a necessary control operation in order to convert the input voltage of the first external device connected to the input port into the output voltage through the converter when being executed by the processor. In this case, when the output voltage is lower than a target value, a necessary operation is performed in order to control the converter so that the output voltage reaches the target value by increasing a pulse width of the control signal applied to the converter 130. According to an embodiment, the electronic apparatus 100 may download and execute a computer program stored in a separate computer program product to perform the operation of the processor 140.

In addition, according to an embodiment, the operation of the processor 140 may be stored in a recording medium and may be implemented as a computer readable program. A program, that is, data, stored in the recording medium may be directly accessed and executed by the processor 140 or may be downloaded to and executed in the electronic apparatus 100 through a transmission medium implemented through a wired/wireless network in which computer systems are coupled to each other to execute an operation.

The processor 140 may perform at least some of data analysis, processing, and result information generation for controlling the converter so that the output voltage reaches the target value, using at least one of a machine learning, a neural network, or a deep learning algorithm as a rule-based or artificial intelligence algorithm.

As an example, the processor 140 may perform functions of a learning unit and a recognizing unit. The learning unit may perform, for example, a function of generating a learned neural network, and the recognizing unit may perform a function of recognizing (or inferring, predicting, estimating, and determining) data using the learned neural network. The learning unit may generate or update the neural network. The learning unit may acquire learning data to generate the neural network. For example, the learning unit may acquire the learning data from the storage 160 or a device or a storage that is outside (or external) to the electronic apparatus 100. The learning data may be data used for learning the neural network, and the learning unit may learn the neural network using, for example, a maximum available current of the first external device determined by the input determination unit 170, a voltage required by the second external device, and the like, as described later, as the learning data.

The learning unit may perform pre-processing on the acquired learning data or select data to be used for learning among a plurality of learning data, before learning the neural network using the learning data. For example, the learning unit may process the learning data in a predetermined format, filter the learning data, or add or remove noise to or from the learning data to process the learning data in a form suitable for learning. The learning unit may generate a neural network configured to identify the maximum available current of the first external device, the voltage required by the second external device, and the like, using the pre-processed learning data.

The learned neural network may include a plurality of neural networks (or layers). Nodes of the plurality of neural networks have weights, and the plurality of neural networks may be connected to each other so that an output value of one neural network is used as an input value of another neural network. Examples of the neural network may include models such as a convolutional neural network (CNN), a deep neural network (DNN), a recurrent neural network (RNN), a restricted Boltzmann machine (RBM), a deep belief network (DBN), a bidirectional recurrent deep neural network (BRDNN), and a deep Q-network.

The communication unit 150 may receive information on a magnitude of the required voltage of the second external device connected to the output port, such as a USB PD block to be described later or communicate with the first external device of a USB PD standard connected to the input port to request the first external device to provide an input voltage of a predetermined magnitude to the second external device. The communication unit 150 may be implemented by a hardware. For instance, the communication unit 150 may include electronic components and circuits configured to receive information on a magnitude of the required voltage of the second external device connected to the output port or communicate with the first external device of a USB PD standard connected to the input port to request the first external device to provide an input voltage of a predetermined magnitude to the second external device.

The storage 160 may include a non-volatile memory capable of reading and writing data, such as a flash memory or a hard disk drive. The storage 160 may be provided to be accessible by the processor 140, and search, reading, writing, deletion, update, and the like, of the data in the storage 160 are performed by the processor 140.

The data stored in the storage 160 may be data accessible by the processor 140, and may include, for example, an operating system for driving the electronic apparatus 100, and various software, programs, applications, video data, additional data, and the like, executable on the operating system. Information on the maximum available currents of each input port measured by the input determination unit 170 according to an embodiment of the disclosure is stored in the storage 160.

Figure 3:
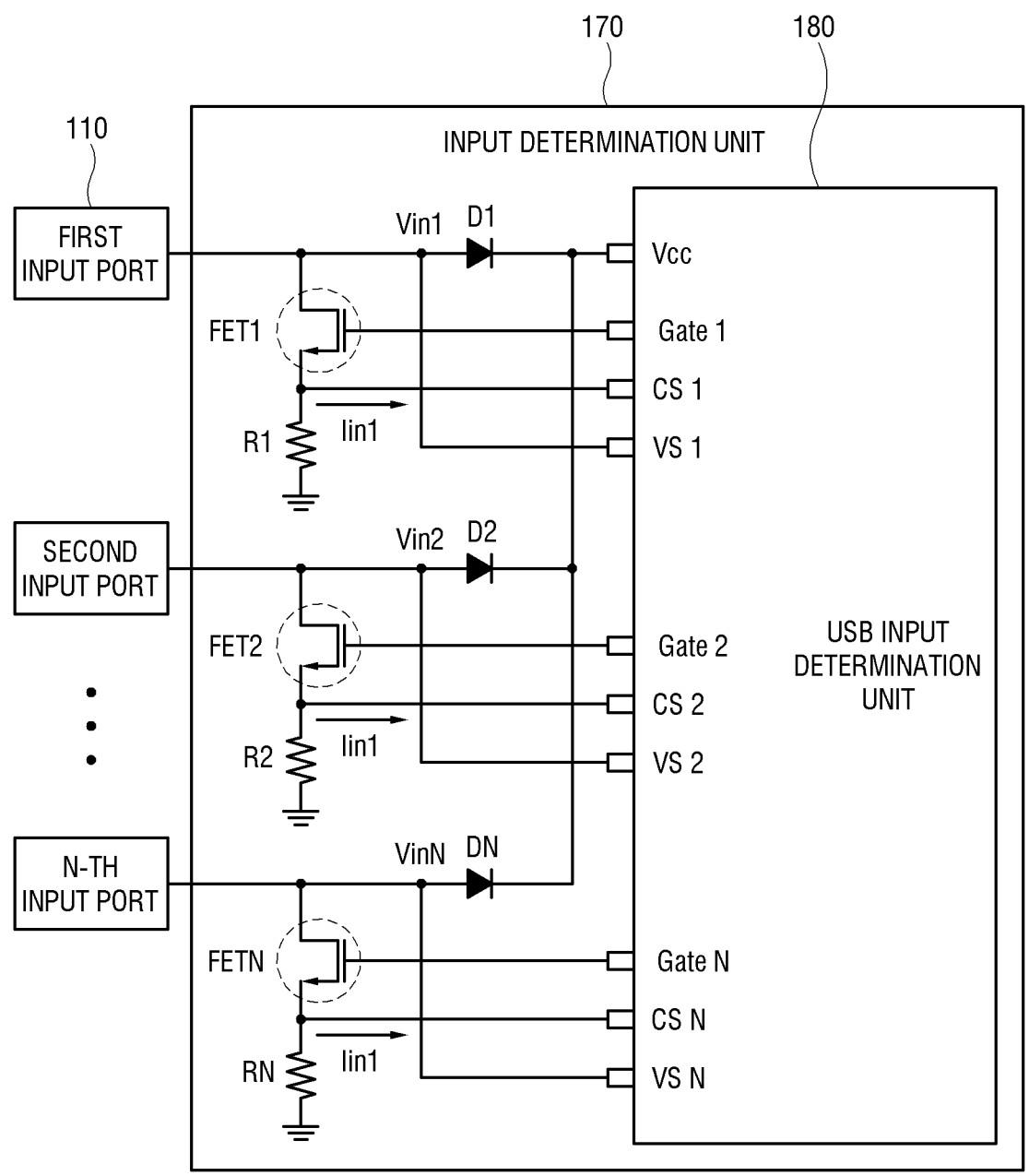
FIG. 3 is a diagram illustrating an input determination unit of the electronic apparatus according to an embodiment of the disclosure.

FIG. 3 is a diagram illustrating the input determination unit of the electronic apparatus according to an embodiment of the disclosure. Since the power provided from each input port 110 has a different maximum output value depending on a type of the first external device and a type of the port, it is necessary to determine a maximum output power for each input port in order to output power required by the second external device connected to the output port. Therefore, the input determination unit 170 measures the maximum available currents that the first external devices connected to the input ports may be able to supply to the electronic apparatus 100.

The input determination unit 170 includes a USB input determination unit 180 and a plurality of additional circuits. The plurality of additional circuits are provided for each input port 110, and each additional circuit includes a field effect transistor (FET) (such as FET1, FET2, ..., FETN), which is a type of transistor, a resistor (such as R1, R2, ..., RN), and a diode (D1, D2, ..., DN). According to the embodiment, the additional circuit is configured using the FET in order to control a magnitude of the input current (such as Iin1), but is not limited thereto, and the magnitude of the input current (such as Iin1) may also be controlled using another type of transistor such as a bipolar junction transistor (BJT) or another type of element such as a variable resistor. Both ends of the FET are connected to each input port 110 and a resistor (such as R1, R2, ..., RN), respectively, and the other end of the resistor (such as R1, R2, ..., RN) is grounded. One end of the diode is connected to the FET (such as FET1, FET2, ..., FETN), and the other end of the diode is connected to the USB input determination unit 180.

According to an embodiment, the USB input determination unit 180 may be implemented as a hardware component. According to an embodiment, the USB input determination unit 180 may be implemented in a chip form and may include a plurality of pins. The plurality of pins include a power pin Vcc and a plurality of sub-pin sets. The plurality of input ports 110 are commonly connected to the power pin Vcc. When the first external devices are connected to each input port 110, operation power is supplied to the USB input determination unit 180, and the USB input determination unit 180 may perform an operation. Since the plurality of input ports 110 are commonly connected to the power pin Vcc, even though the first external device is connected to any one of the plurality of input ports 110, the USB input determination unit 180 may perform an operation by receiving operating power supplied from the first external device connected to the input port. The plurality of sub-pin sets are provided so as to correspond to the plurality of input ports 110. Each sub-pin set includes a control signal output pin (such as Gate1, Gate2, ..., GateN), a current sensing pin (such as CS1, CS2, ..., CSN), and a voltage sensing pin (such as VS1, VS2, ..., VSN).

The USB input determination unit 180 outputs a control signal controlling an operation of each FET (such as FET1, FET2, ..., FETN) through each control signal output pin (such as Gate1, Gate2, ..., GateN). A magnitude of the control signal is adjusted so that each FET (such as FET1, FET2, ..., FETN) may operate in a linear mode, in consideration of a gate voltage of each FET (such as FET1, FET2, ..., FETN). That is, a magnitude of a current flowing through each FET (such as FET1, FET2, ..., FETN) may be adjusted according to the magnitude of the control signal. Each current sensing pin (such as CS1, CS2, ..., CSN) is connected to a point between each FET (such as FET1, FET2, ..., FETN) and each resistor (such as R1, R2, ..., RN), and the USB input determination unit 180 may sense the magnitude of the current (such as Iin1) flowing through each FET (such as FET1, FET2, ..., FETN) through each current sensing pin (such as CS1, CS2, ..., CSN). Each voltage sensing pin (such as VS1, VS2, ..., VSN) is connected to a point between each FET (such as FET1, FET2, ..., FETN) and each diode, and the USB input determination unit 180 may sense a magnitude of an input voltage (such as Vin1) of each input port 110 through each voltage sensing pin (such as VS1, VS2, ..., VSN). The USB input determination unit 180 may operate under the control of the processor 140. A detailed determining method will be described later in a description of FIG. 4.

Figure 4:
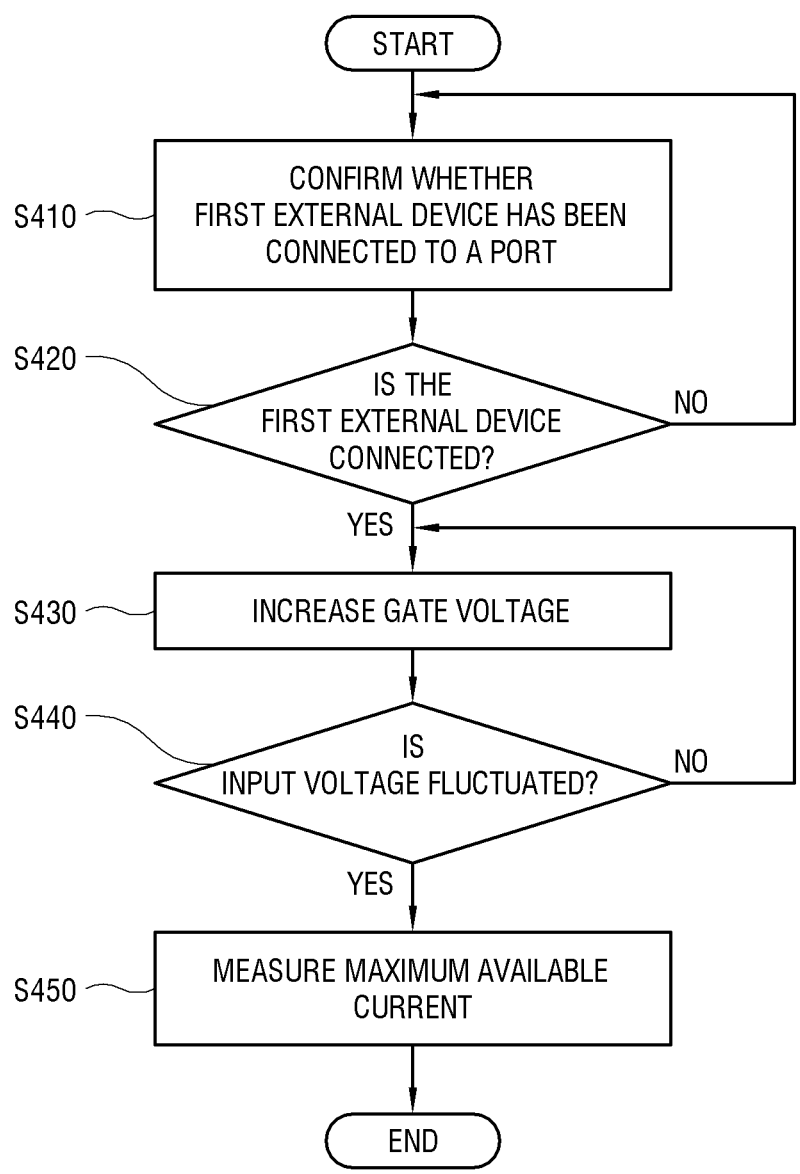
FIG. 4 is a flowchart illustrating an operation sequence of the input determination unit of the electronic apparatus according to an embodiment of the disclosure.

FIG. 4 is a flowchart illustrating an operation sequence of the input determination unit illustrated in FIG. 3 according to an embodiment of the disclosure.

According to an embodiment, the USB input determination unit 180 confirms whether a first external device is connected to one of the input ports 110 (S410). Based on a determination that the first external device is connected to the input port 110 (YES in S420), the USB input determination unit 180 outputs a control signal so that the gate voltage of the FET (such as FET1) connected to the input port 110 to which the first external device is connected is increased (S430).

When the gate voltage is increased according to the control signal, the current flowing through the FET (such as FET1) is also increased. The magnitude of the control signal may be set to a sufficiently low magnitude at first, and be gradually increased until the current flowing through the FET (such as FET1) reaches a magnitude corresponding to the maximum available current, in consideration of a magnitude of a maximum current (hereinafter, also referred to as a maximum available current) that may be supplied by the first external device. The USB input determination unit 180 confirms whether a fluctuation is generated in the input voltage (such as Vin1) (S440) while gradually increasing the gate voltage of the FET (such as FET1) by outputting the control signal so that the current supplied from the first external device is increased. That is, when the current input from the first external device connected to the input port is gradually increased to exceed the maximum available current, the supply of the current from the first external device is cut off by a port protection operation of the USB. Accordingly, the input voltage (such as Vin1) drops instantaneously. When the fluctuation is not generated in the input voltage (such as Vin1) (NO in S440), the USB input determination unit 180 continuously performs operation S430 to output the control signal so that the current supplied from the first external device is increased, resulting in an increase in the gate voltage of the FET (such as FET1). According to an embodiment, the presence or absence of the fluctuations may be determined based on amount (or magnitude) of change in the voltage by a specific value within a first period of time. The duration of first period of time may be very short.

When the fluctuation is generated in the input voltage (such as Vin1), that is, when the input voltage (such as Vin1) rapidly drops (Yes in S440), the USB input determination unit 180 measures a current flowing through the FET (such as FET1) at this time as the maximum available current of the first external device (S450). According to an embodiment, the drop in the input voltage is equal to or greater than a specific value. According to an embodiment, the drop in the input voltage is equal to or greater than a predetermined value. The USB input determination unit 180 stores a value corresponding to the maximum available current of the first external device in the storage 160. Moreover, the USB input determination unit 180 may and sequentially perform measurement of the maximum available currents for each of a plurality of first external devices connected to each respective input port 110 in a case where the plurality of first external devices are connected to the input ports.

FIG. 5 is a circuit diagram illustrating the converter 130 and the processor 140 of the electronic apparatus according to an embodiment of the disclosure.

FIG. 5 illustrates a case where there are two input ports (first input port 110-1 and second input port 110-2) for convenience of explanation. The converter 130 of the electronic apparatus 100 includes two sub-converters (first DC-DC converter 130-1 and second DC-DC converter 130-2) each corresponding to the first input port 110-1 and the second input port 110-2. Input terminals of the first DC-DC converter 130-1 and the second DC-DC converter 130-2 are connected to the first input port 110-1 and the second input port 110-1, respectively, and output terminals of the first DC-DC converter 130-1 and the second DC-DC converter 130-2 are integrated into one and connected to the output port. That is, power supplied from the two input ports may be output as one integrated power. The processor 140 is connected to the output terminal of each DC-DC converter and an input terminal of each input port to control the first DC-DC converter 130-1 and the second DC-DC converter 130-2 to output target voltages, and confirms whether power has reached maximum power (hereinafter, also referred to as 'maximum available power') that may be supplied from each input port to adaptively control an operation of each DC-DC converter.

Specifically, the processor 140 includes a first comparator 510 and a first duty control block PID for the purpose of voltage feedback duty control based on an output voltage Vout of the converter, and input currents Iin1 and Iin2 of each input port, and includes a second comparator 520 and a second duty control block PI for the purpose of current monitoring duty control based on input currents Iin1 and Iin2 of each input port. In addition, the processor 140 includes a third comparator 530, a sawtooth wave generator 540, and a control signal output unit 550 in order to output control signals PWM1 and PWM2 whose pulse widths are determined by integrating the voltage feedback duty control and the current monitoring duty control with each other. A plurality of second comparators 520 and a plurality of second duty control blocks PI, and a plurality of third comparators 530 and a plurality of control signal output units 550 are provided for each input port/DC-DC converter. In this case, each duty control block may be proportional integral derivative (PID) control or proportional integral (PI) control, and is not limited to any one of the PID control or the PI control.

When the first external devices are connected to the first and second input ports (110-1 and 110-2), respectively, the input voltages Vin1 and Vin2 are applied, and the input voltage is converted into the output voltage Vout through the DC/DC converter connected to each input port. The processor 140 controls an operation of each DC-DC converter (130-1 and 130-2) so that the output voltage Vout reaches a reference voltage Vref through the voltage feedback duty control. In this case, the processor 140 may identify a voltage required by the second external device connected to the output port and set the identified voltage as the reference voltage Vref. A detailed description for identification of the voltage required by the second external device connected to the output port will be provided later. As another embodiment, the processor 140 may set a predefined default value as the reference voltage Vref. When the output voltage Vout is lower than the reference voltage Vref as a determination result of the first comparator 510, the processor 140 controls the converter 130 so that pulse widths of the control signals PWM1 and PWM2 each applied to the first and second DC-DC converters are increased by increasing a first duty control value Ref.Duty1 in the first duty control block PID. The control signal output units 550 of the processor 140 output the control signals PWM1 and PWM2 having corresponding pulse widths to the first and second DC-DC converters, respectively, based on first duty control values Ref.Duty1 transferred through the third comparators 530 and a sawtooth wave generated by the sawtooth wave generator 540. The first and second DC-DC converters increase the output voltage Vout by the control signals PWM1 and PWM2 having the increased pulse widths, and the processor 140 continuously performs the voltage feedback duty control until the output voltage Vout reaches the reference voltage Vref.

Meanwhile, the processor 140 according to an embodiment of the disclosure performs the current monitoring duty control based on the input currents Iin1 and Iin2, in addition to the voltage feedback duty control described above. The processor 140 monitors the input currents Iin1 and Iin2 each flowing through the first and second input ports using the second comparators 520, and compares the input currents Iin1 and Iin2 with maximum available currents Imax1 and Imax2 measured by the USB input determination unit 180. When the output voltage Vout is lower than the reference voltage Vref and the monitored input currents Iin1 and Iin2 do not reach the maximum available currents Imax1 and Imax2, the processor 140 controls the second duty control blocks PI to increase and output the second duty control values Ref.Duty2. That is, the processor 140 performs additional control to increase the second duty control values Ref.Duty2 in the current monitoring duty control, in addition to increasing the first duty control value Ref.Duty1 in the voltage feedback duty control, using the third comparators 530. That is, the entire pulse width control of the control signals PWM1 and PWM2 each applied to the first and second DC-DC converters is the sum of the voltage feedback duty control and the current monitoring duty control.

As described above, during a period in which the output voltage Vout is lower than the reference voltage Vref, the processor 140 increases the pulse widths of the control signals PWM1 and PWM2 so that the output voltage Vout rises. Therefore, the input currents Iin1 and Iin2 may continuously increase within allowable limits, that is, maximum available current ranges, of the first external devices connected to each of the first and second input ports. Thereafter, when the output voltage Vout reaches the reference voltage Vref within the maximum available current ranges of each of the first external devices connected to the input ports, the pulse widths of the control signals PWM1 and PWM2 do not need to be increased any more. In this case, the processor 140 may maintain the first duty control value Ref.Duty1 in the voltage feedback duty control or appropriately increase or decrease the first duty control value Ref.Duty1 adaptively according to a situation to continuously apply the output voltage Vout matched to the reference voltage Vref. In this case, as long as there is no fluctuation of a load, the input currents Iin1 and Iin2 may be maintained without being increased. Therefore, the electronic apparatus 100 may supply the power required by the second external device.

When one of the input currents Iin1 and Iin2 is expected to exceed the maximum available current Imax1 or Imax2 in a process in which the input currents Iin1 and Iin2 are increased, the processor 140 decreases the second duty control value Ref.Duty2 corresponding to the input current expected to exceed the maximum available current. The decrease in the second duty control value Ref.Duty2 is offset by the increase in the first duty control value Ref.Duty1 in the voltage feedback duty control by the third comparator 530. As a result, the pulse width of the control signal PWM1 or PWM2 applied to the corresponding DC-DC converter is maintained. Therefore, the current input from the corresponding first external device is not increased any more, such that a supply current of the first external device does not exceed the maximum available current, and stability of power supply is thus improved.

When the output voltage Vout still does not reach the reference voltage Vref in a state where any one of the input currents Iin1 and Iin2 exceeds the maximum available current Imax1 or Imax2, the processor 140 performs control so that the output voltage Vout reaches the reference voltage Vref by increasing the pulse width of the control signal applied to the DC-DC converter connected to the input port in which the input current has not exceed the maximum available current.

Thereafter, when the output voltage Vout reaches the reference voltage Vref through the voltage feedback duty control and the current monitoring duty control described above, the processor 140 controls the converter 130 to maintain the pulse widths of the control signals PWM1 and PWM2.

Figure 6:
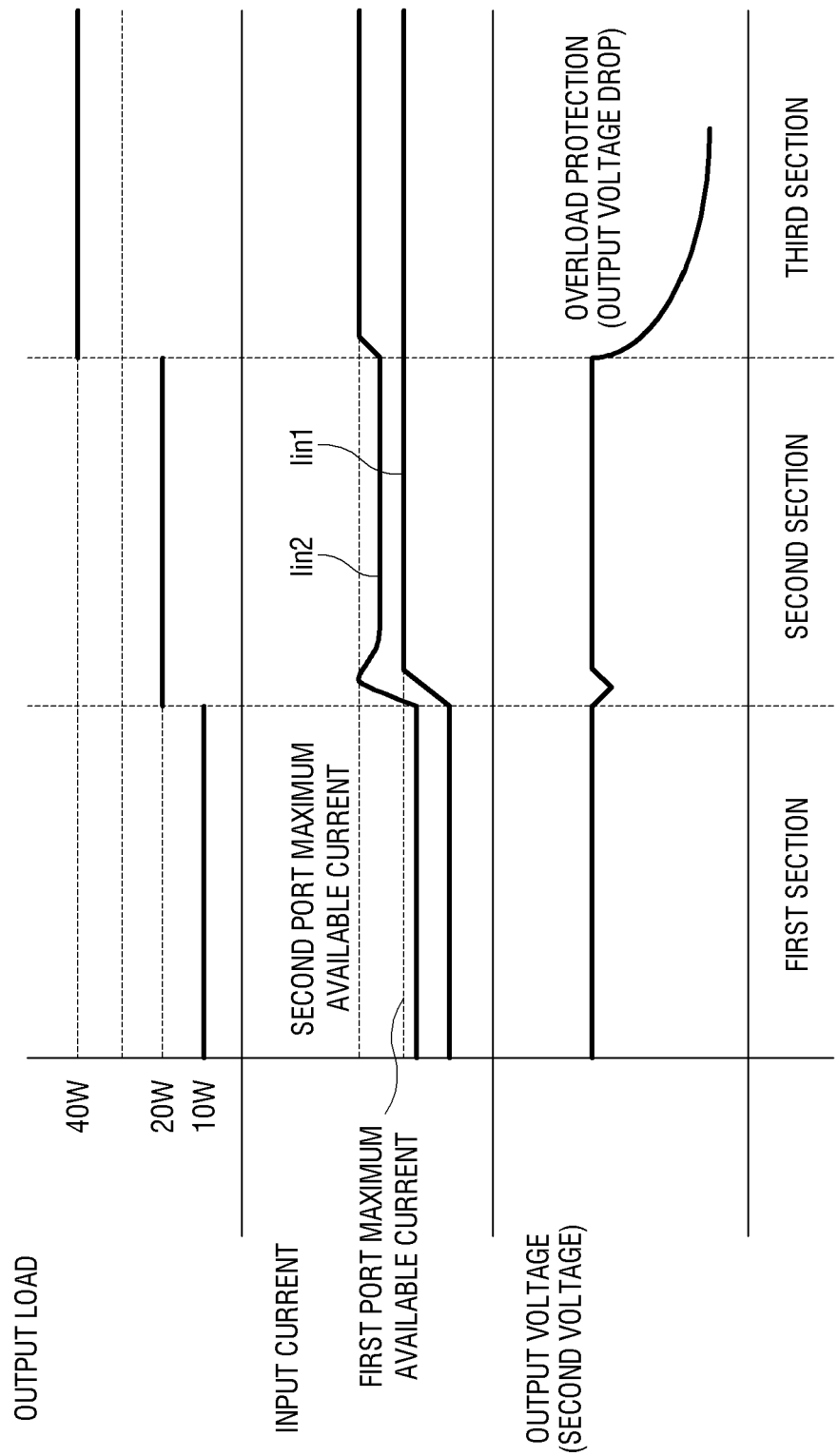
FIG. 6 is a diagram illustrating input currents for each port and an output voltage according to an output load according to an embodiment of the disclosure.

FIG. 6 is a diagram illustrating input currents for each port and an output voltage according to an output load according to an embodiment of the disclosure.

Changes in input currents and an output voltage according to an increase in power consumption for each output load when first external devices each having maximum available power of 10 W and maximum available power of 20 W are connected to the input ports according to an embodiment of the disclosure will be described. The maximum available power of the embodiment may be determined by maximum available currents and input voltages of each of first external devices.

In a first section, it is assumed that a second external device of a load of 10 W is connected to the output port. A reference voltage is a voltage satisfying output power of 10 W required by the second external device. For example, it is assumed that the first external devices each having the maximum available power of 10 W and the maximum available power of 20 W supply power of 4 W and power of 6 W, respectively, to satisfy the power of 10 W required by the second external device. In this section, as described with reference to FIG. 5, the two first external devices are in a state where neither of them do not exceed the maximum available power, that is, the maximum available currents, and thus, the voltage feedback duty control and the current monitoring duty control are mutually reinforced and operated.

In FIG. 6, the output voltage is constant, which indicates that the output voltage has already reached the target value as a result of the duty control. Therefore, a duty of the control signal applied to the entire converter is substantially maintained, and a duty may be slightly increased or decreased in each sub-converter within the range.

Next, in a second section, it is assumed that a second external device of a load of 20 W is connected to the output port. In this case, since the output load is rapidly increased, the output voltage instantaneously drops while electric charges held in an output capacitor are rapidly consumed. Therefore, the voltage feedback duty control is substantially operated again, such that a duty of the control signal applied to the converter is increased until the output voltage reaches the target value. In this process, the currents are rapidly increased as compared with the first section. At this time, both of the input currents of the two first external devices are increased, but it is expected that the input current (Iin1) of the first external device having relatively small maximum available power of 10 W will first exceed the maximum available current. Therefore, the control method to prevent the maximum available current exceeded, as described in FIG. 5, is executed, such that the processor maintains the duty of the sub-converter corresponding to the first external device of 10 W. Meanwhile, this state is a state where the power required by the output load has not yet been sufficiently supplied, and thus, the input current of the first external device of 20 W that does not exceed the maximum available current is continuously increased. Thereafter, when the output voltage reaches the target value, control to maintain the entire duty as in the first section is operated.

Finally, in a third section, it is assumed that a second external device of a load of 40 W is connected to the output port. Since the output load has been rapidly increased as in a case of switching from the first section to the second section, a duty of the sub-converter corresponding to the first external device of 20 W is increased again by duty control. However, in this case, the input current is not increased much and is expected to exceed the maximum available current, such that the maximum available current excess prevention control is executed, and the duty of the sub-converter corresponding to the first external device of 20 W is maintained.

As a result, the total input current may not be increased any more, and a supply current thus becomes shorter than the current required by the output load, such that the electric charges held in the output capacitor are decreased. Therefore, an overload protection operation is naturally performed, such that the output voltage drops, and thus, the stability of the power supply is further improved.

Figure 7:
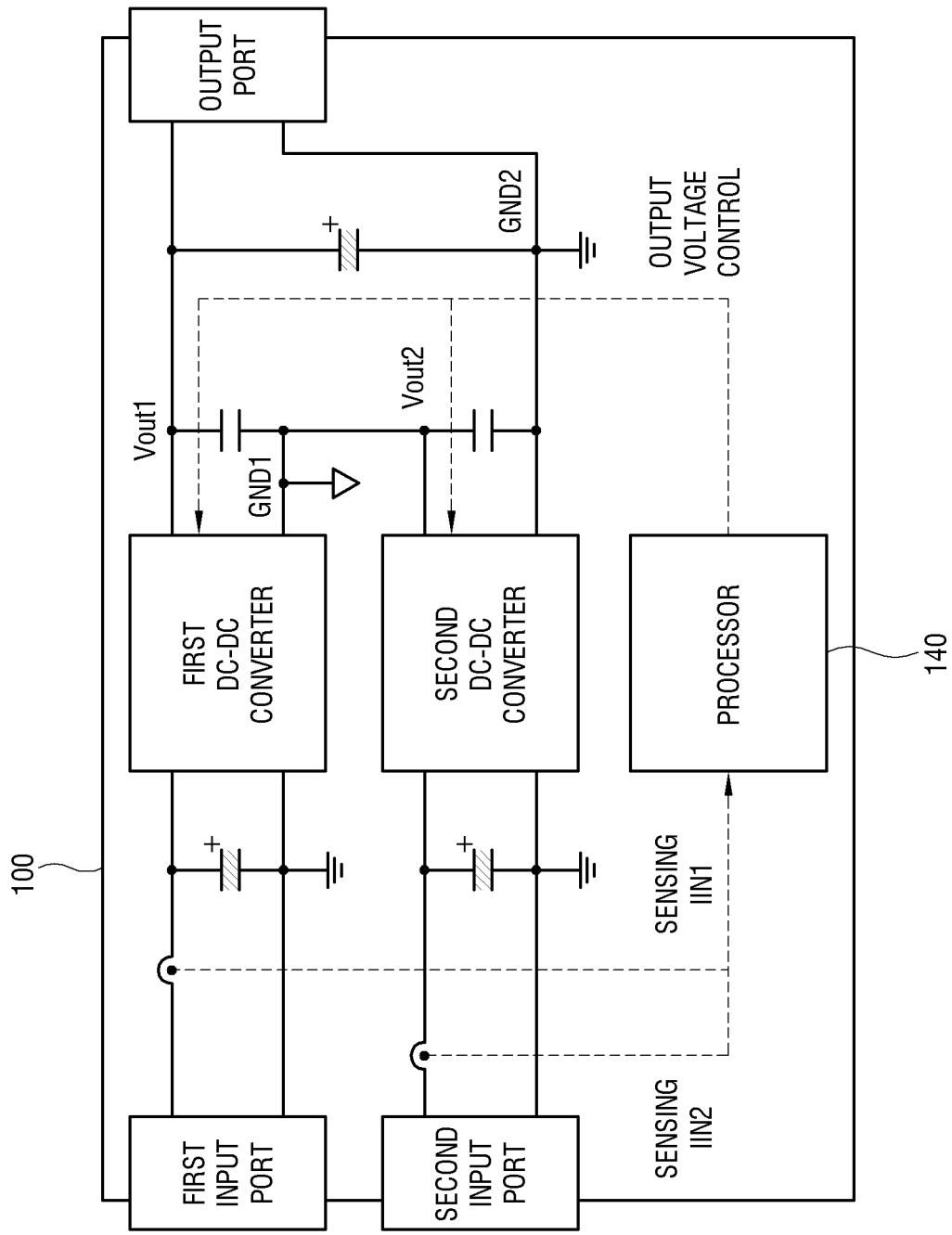
FIG. 7 is a diagram illustrating an electronic apparatus when converters are connected to each other in series according to an embodiment of the disclosure.

FIG. 7 is a diagram illustrating an electronic apparatus when converters are connected to each other in series according to an embodiment of the disclosure. Regarding an electronic apparatus 100 according to the embodiment, a description for components that are the same as or similar to those of the electronic apparatus 100 described with reference to FIGS. 1 to 6 will be omitted.

In the electronic apparatus 100 according to an embodiment of the disclosure, output terminals Vout1 and Vout2 of two DC-DC converters (first DC-DC converter and second DC-DC converter) are connected to each other in series. Therefore, output voltages of the two DC-DC converters overlap each other to become large, and a higher output voltage may thus be provided. The DC-DC converter of the embodiment may be implemented as an isolated converter. In this case, GNDs GND1 and GND2 of each output voltage may be made different from each other, which is effective to stack and configure the output terminals GND1 and GND2 in series as illustrated in FIG. 7.

Figure 8:
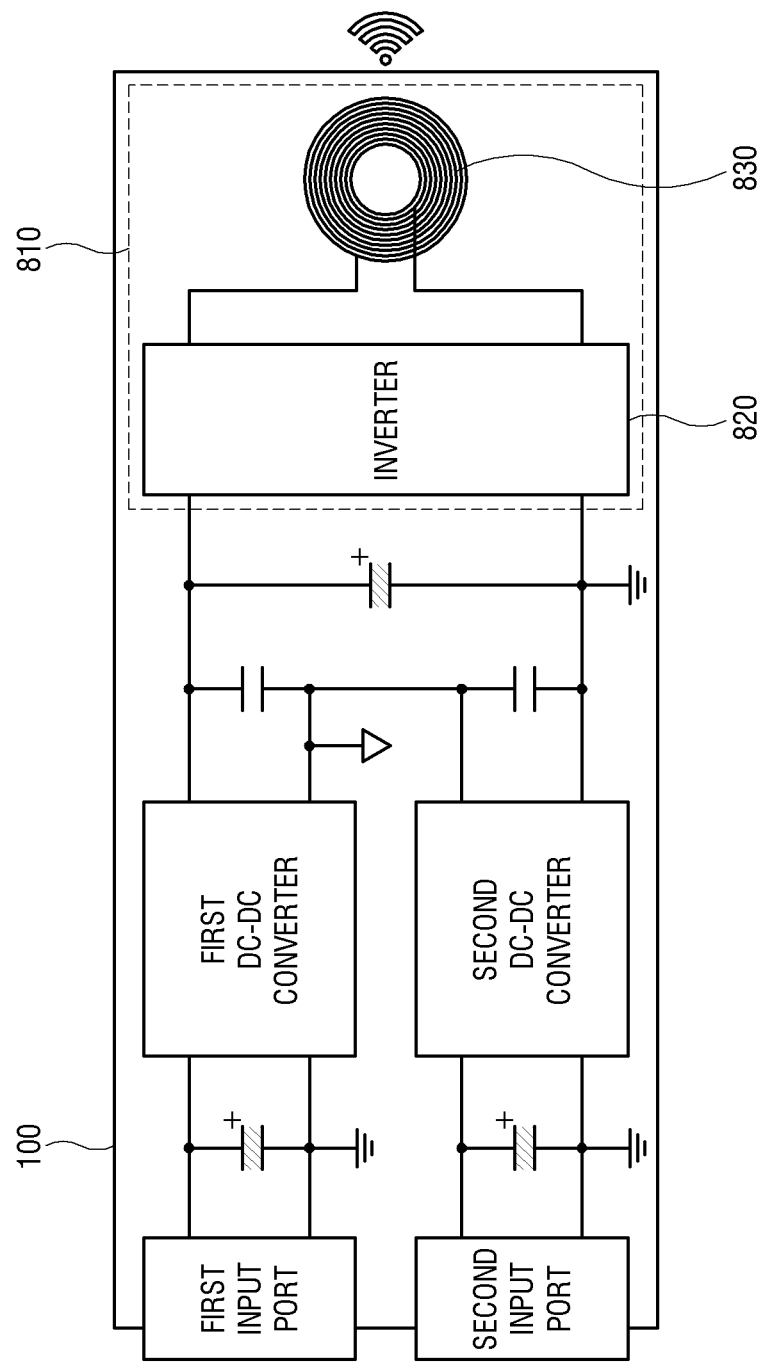
FIG. 8 is a diagram illustrating an electronic apparatus supplying power through wireless transmission according to an embodiment of the disclosure.

FIG. 8 is a diagram illustrating an electronic apparatus supplying power through wireless transmission according to an embodiment of the disclosure. Regarding an electronic apparatus 100 according to the embodiment, a description for components that are the same as or similar to those of the electronic apparatus 100 described with reference to FIGS. 1 to 7 will be omitted.

The electronic apparatus 100 according to an embodiment of the disclosure includes a wireless power transmission circuit 810 capable of wirelessly supplying power. The wireless power transmission circuit 810 of the embodiment may perform wireless power transmission by an inductive coupling method of transmitting power to a second external device by generating a magnetic field vibrating at a predetermined frequency. In the embodiment, the second external device includes a wireless power reception circuit capable of wirelessly receiving power so as to correspond to the wireless power transmission circuit 810. The wireless power transmission circuit 810 of the embodiment includes an inverter 820 and a resonant coil 830. A primary side of the inverter 820 is connected to output terminals of DC-DC converters, a secondary side of the inverter 820 may include a transformer connected to the resonant coil 830, and a switching element. The inverter 820 controls an operation of the switching element interrupting a current flowing through the transformer to convert a DC voltage output from the DC-DC converter into an AC voltage having a preset resonance frequency, and outputs the AC voltage to the resonant coil 830. The resonant coil 830 generates a magnetic field vibrating at a resonant frequency according to the AC voltage output from the transformer to magnetically induce a receiving-side resonant coil provided in the wireless power reception circuit of the second external device, thereby allowing wireless power to be transmitted to the second external device. The wireless power transmission circuit 810 of the embodiment may be implemented integrally with the electronic apparatus 100 or may be implemented as a separate apparatus 1210 (see FIG. 12) independent of the electronic apparatus 100. In the latter case, the electronic apparatus 100 may include a connection unit that may be connected to the wireless power transmission circuit 810 provided in the apparatus 1210.

When the power is wirelessly transmitted, the higher the input voltage of the inverter 820 and the lower the current, the higher the power transmission efficiency. Therefore, the electronic apparatus 100 according to the embodiment is effective in transmitting power with high efficiency by designing a large input voltage when the second external device requires a large output voltage. Particularly, when the DC-DC converters are stacked in series as illustrated in FIG. 8, it is advantageous because a larger input voltage may be obtained. However, the electronic apparatus 100 according to the embodiment is not necessarily limited thereto, and may also be applied in a case where the DC-DC converters according to an embodiment of the disclosure are connected to each other in parallel as illustrated in FIG. 5.

According to the embodiment, the second external device does not need to be connected to an output port in a wired manner, and may thus be used even though the second external device is spatially separated from the electronic apparatus, which is more convenient for a user.

Figure 9:
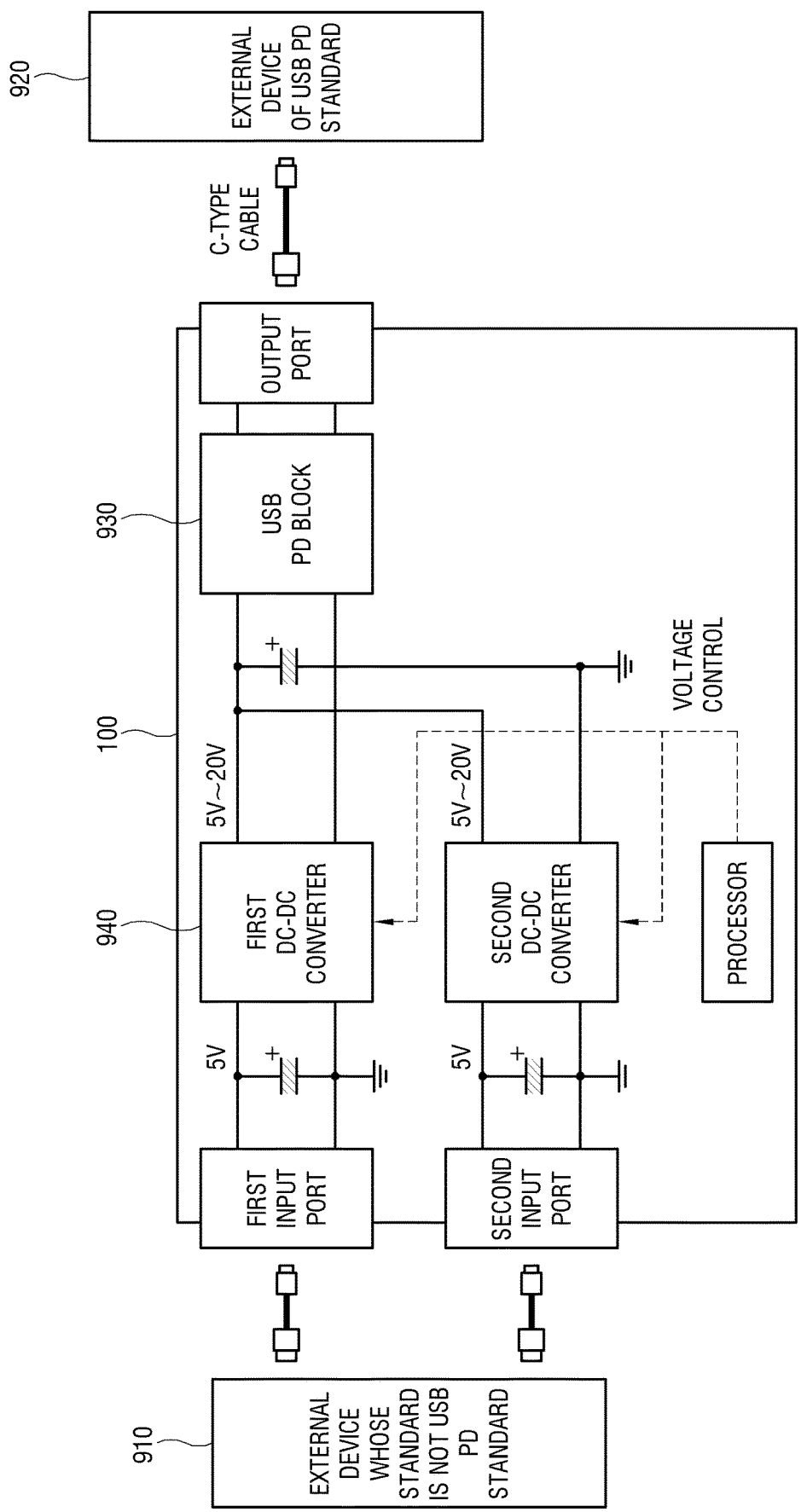
FIG. 9 is a diagram illustrating another example of an electronic apparatus according to an embodiment of the disclosure.

FIG. 9 is a diagram illustrating another example of an electronic apparatus 100 according to an embodiment of the disclosure. Regarding an electronic apparatus 100 according to the embodiment, a description for components that are the same as or similar to those of the electronic apparatus 100 described with reference to FIGS. 1 to 8 will be omitted. The electronic apparatus 100 according to the embodiment matches a voltage applied from a first external device 910 on an input side thereof to a voltage of a magnitude required by a second external device 920 on an output side thereof to supply power. The second external device 920 of the embodiment may be, for example, a device of a USB PD standard. On the other hand, the first external device 910 connected to an input port of the embodiment may not be a device of a USB PD standard. That is, the electronic apparatus 100 according to the embodiment supplies power of the first external device 910 whose standard is not the USB PD standard to the second external device 920 in the USB PD standard.

The electronic apparatus 100 according to an embodiment of the disclosure further includes a USB PD block 930. The USB PD block 930 is provided between output terminals of DC-DC converters 940 and an output port. The USB PD block 930 may perform communication with the second external device 920 of the USB PD standard connected to the output port to receive information on a magnitude of a required voltage of the second external device 920. In this case, the USB PD block 930 may receive the information on the magnitude of the required voltage of the second external device 920 through data transmission pins of a USB connector of the output port in the same manner as that of the USB connector of the input port described above. The processor 140 may identify the magnitude of the required voltage of the second external device 920 based on the information received through the USB PD block 930. The processor 140 sets the reference voltage Vref of the converter as described above with reference to FIG. 5 based on the identified magnitude of the required voltage. Subsequently, the processor 140 controls the DC-DC converter 940 so that the output voltage Vout of the DC-DC converter 940 reaches the reference voltage Vref, that is, the magnitude of the required voltage of the second external device 920, as described above with reference to FIG. 5. When the first external device 910 is a device of an ordinary USB standard, the first external device 910 provides an input voltage of, for example, 5 V. The required voltage of the second external device 920 of the USB PD standard may be, for example, about 5 V to 20 V. The DC-DC converter 940 of the present embodiment may be implemented as, for example, a boost converter boosting the input voltage of 5

V in order to match the input voltage to the magnitude of the required voltage of the second external device 920.

The electronic apparatus 100 according to the embodiment may provide power matched to a voltage of the magnitude required by the second external device. In addition, the electronic apparatus 100 may supply the power to the second external device 920 having the USB PD standard even though the first external device 910 is not the device of the USB PD standard, and thus serves as an adapter between the second external device of the USB PD standard and the first external device whose standard is different from the USB PD standard. In addition, the electronic apparatus 100 may supply the power to the second external device at an output voltage higher than the input voltage of the first external device.

Figure 10:
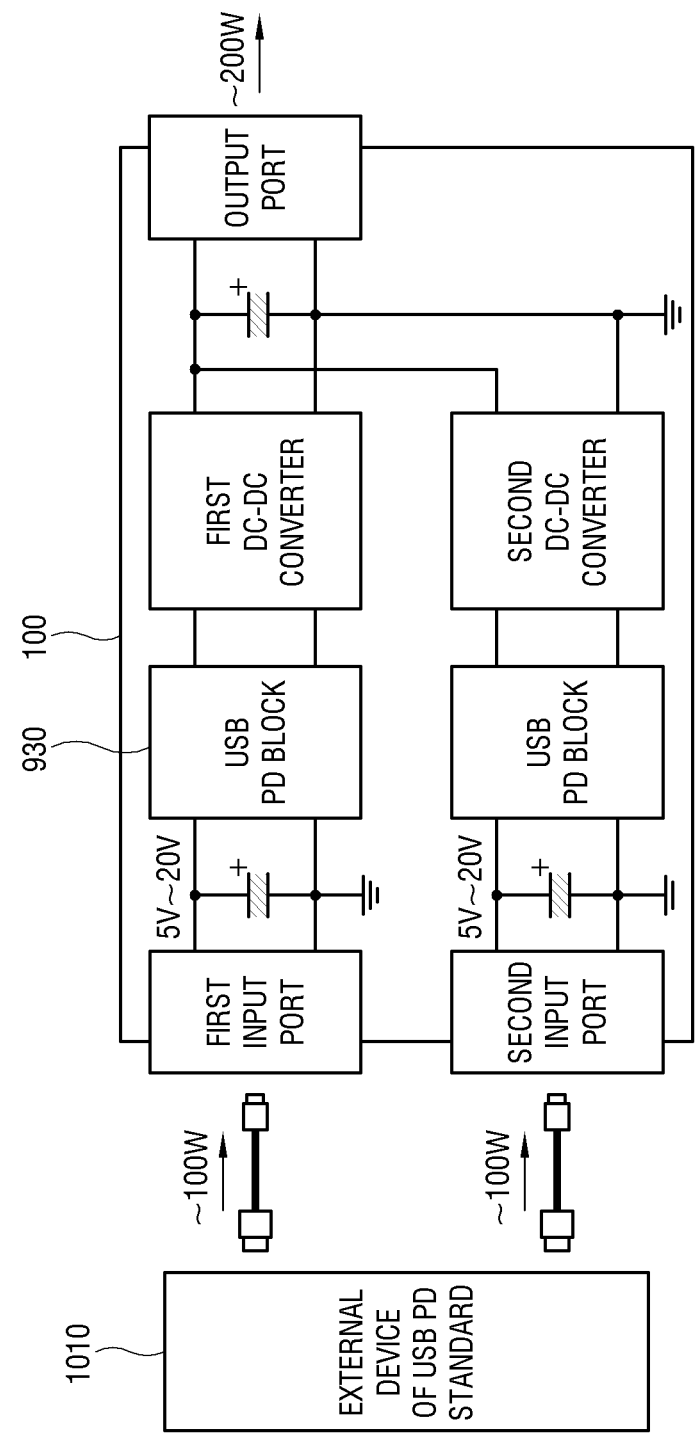
FIG. 10 is a diagram illustrating still another example of an electronic apparatus according to an embodiment of the disclosure.

FIG. 10 is a diagram illustrating still another example of an electronic apparatus 100 according to an embodiment of the disclosure. Regarding an electronic apparatus 100 according to the embodiment, a description for components that are the same as or similar to those of the electronic apparatuses 100 described with reference to FIGS. 1 to 9 will be omitted. The electronic apparatus 100 according to the embodiment requests a first external device 1010 on an input side to provide an input voltage of a required magnitude and supplies power. The first external device 1010 of the embodiment may be, for example, a device of a USB PD standard. On the other hand, a second external device connected to an output port of the embodiment may not be a device of a USB PD standard. That is, the electronic apparatus 100 according to the embodiment requests the first external device 1010 of the USB PD standard connected to an input port to provide an input voltage of a magnitude required in order to supply power to the second external device connected to the output port, and supply the power to the second external device. In addition, the electronic apparatus 100 according to the embodiment may supply power of the first external device 1010 supplied in the USB PD standard to the second external device whose standard is not the USB PD standard.

The electronic apparatus 100 according to an embodiment of the disclosure further includes a USB PD block 930. The USB PD block 930 is provided between the input port and an input terminal of a converter. A plurality of USB PD blocks 930 are provided for a plurality of input ports, respectively. Each USB PD block 930 may perform communication with the first external device 1010 of the USB PD standard connected to the corresponding input port to request the first external device 1010 to provide an input voltage of a predetermined magnitude to the second external device. Also in this case, the USB PD block 930 may perform communication with the first external device 1010 through data transmission pins of a USB connector of the input port, as described above. The processor 140 may identify a magnitude of the input voltage to be increased based on an insufficient amount of power when it determines that the power supplied to the second external device connected to the output port is insufficient during operation control of the converter. For example, when an output voltage is decreased to a predetermined value or less, the processor 140 may determine that the power supplied to the second external device is insufficient. The processor 140 transfers information on the identified magnitude increase amount of the input voltage to the USB PD block 930. The USB PD block 930 may request the first external device to provide an input voltage of an increased magnitude to the second external device based on the transferred information on the magnitude increase amount. Subsequently, as described above with reference to FIG. 5, the processor 140 may control the converter 130 so that the output voltage reaches the reference voltage based on the increased input voltage input to the input port, thereby supplying sufficient power required by the second external device to the second external device.

The electronic apparatus 100 according to the embodiment may request the first external device to provide the input voltage of the magnitude required in order to supply the power to the second external device, and supply the power to the second external device. In addition, the electronic apparatus 100 may supply the power of the first external device of the USB PD standard to the second external device even though the second external device is not the device of the USB PD standard, and thus serves as an adapter between the first external device of the USB PD standard and the second external device whose standard is not the USB PD standard. In addition, since the first external device, which is the first external device of the USB PD standard, may supply up to, for example, 100 W per port, the electronic apparatus 100 may supply larger power to the second external device.

Figure 11:
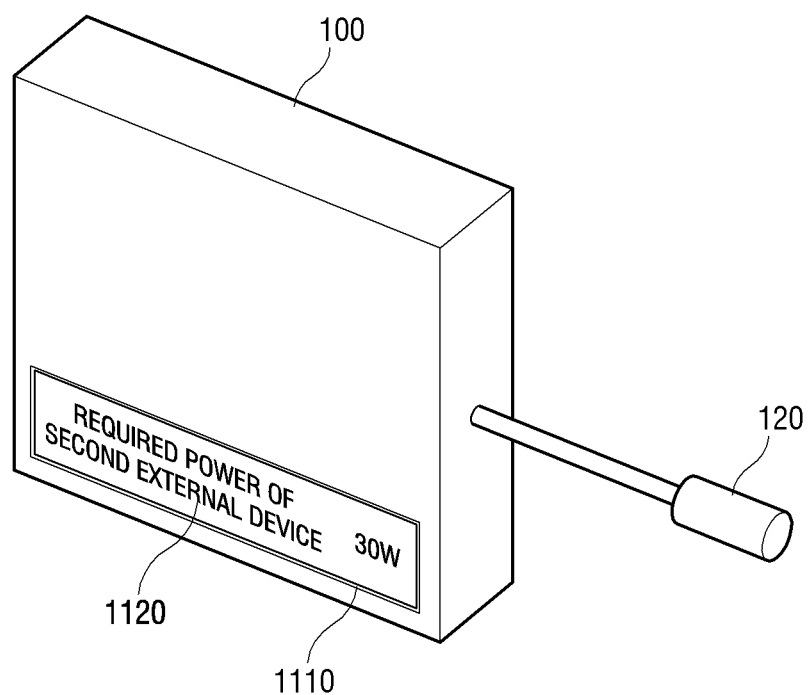
FIG. 11 is a diagram illustrating yet still another example of an electronic apparatus according to an embodiment of the disclosure.

FIG. 11 is a diagram illustrating yet still another example of an electronic apparatus 100 according to an embodiment of the disclosure. Regarding an electronic apparatus 100 according to the embodiment, a description for components that are the same as or similar to those of the electronic apparatus 100 described with reference to FIGS. 1 to 10 will be omitted. The electronic apparatus 100 according to the embodiment displays information on an operation of supplying power from a first external device to a second external device.

The electronic apparatus 100 according to the embodiment further includes a display 1110 capable of displaying information. The display 1110 may visually provide information that may be recognized by a user to the outside of the electronic apparatus 100. The display 1110 may include at least one of, for example, a liquid crystal display (LCD), a thin film transistor-liquid crystal display (TFT LCD), an organic light-emitting diode (OLED), a flexible display, a three-dimensional (3D) display, or an electrophoretic display. When the display 1110 is configured by, for example, a touch screen, the display 1110 may be used as an input device receiving a user input, in addition to a function of displaying information. The display 1110 may display information in a form of, for example, a graphical user interface (UI). The electronic apparatus 100 may include two or more displays 1110 according to an implementation form. The processor 140 controls the display 1110 to display information 1120 on an operation of supplying the power from the first external device to the second external device. The information on the operation of supplying the power of the embodiment may include information on at least one of input voltages/currents or maximum available currents/power of the first external devices connected to each input port, a required voltage/power of the second external device, total outputtable power, whether the required voltage/power has been satisfied, whether to exceed the maximum available currents/power of each input port, an insufficient amount/margin amount of supply power, an increase amount in a voltage/power required for input port, whether the first external devices have been connected to each input port, or a first external device/input port that may be removed when there is a margin in power supply, as well as the example illustrated in FIG. 11. Therefore, the user may confirm whether current power supply is sufficient through the information displayed on the display 1110. Additionally, the user may further connect a first external device to the input port or remove a first external device unnecessarily connected to the input port from the input port, depending on a situation. The display 1110 displaying the information has been disclosed in the embodiment, but the electronic apparatus according to an embodiment of the disclosure is not limited thereto, and may include an audio output unit outputting information as an audio and a communication unit transmitting information to an external apparatus.

The electronic apparatus 100 improves convenience of use for the user by providing the users with information regarding how much power the first external device connected to electronic apparatus 100 is capable of providing or how much power the second external device that connected to electronic apparatus 100 requires.

Figure 12:
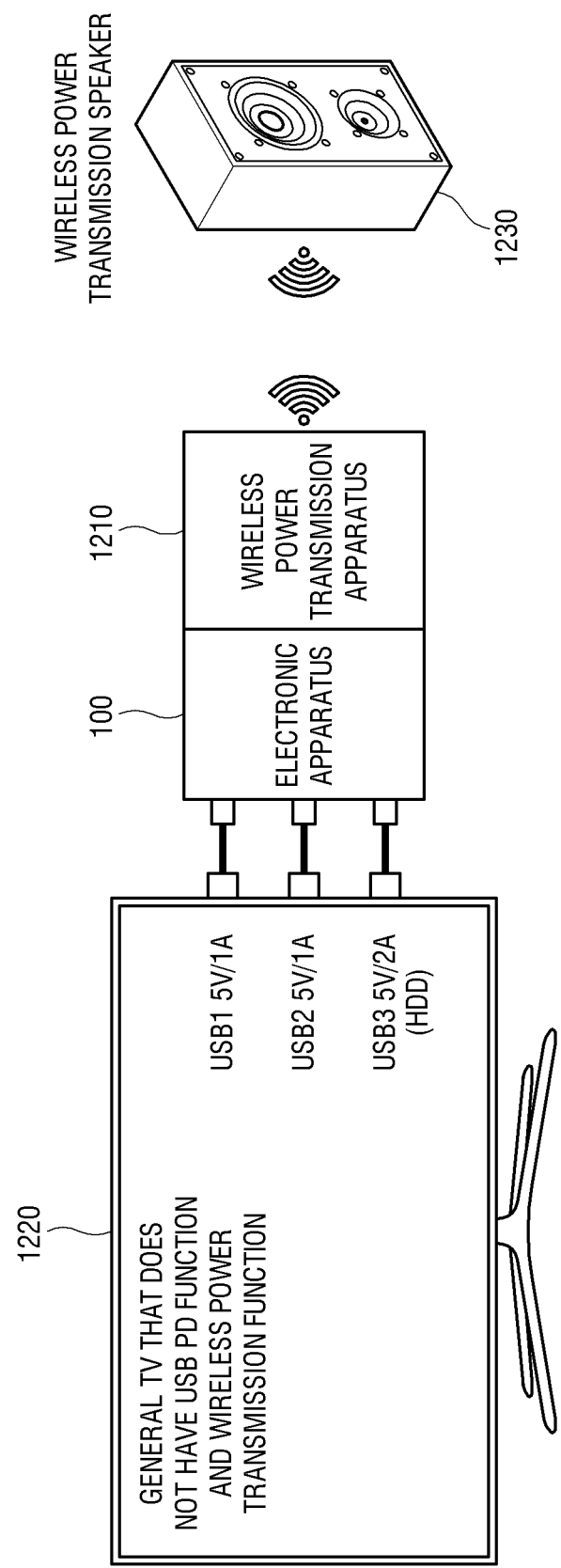
FIG. 12 is a diagram illustrating an actual use example of the electronic apparatus according to an embodiment of the disclosure.

FIG. 12 is a diagram illustrating an actual use example of the electronic apparatus according to an embodiment of the disclosure. As illustrated in FIG. 12, the electronic apparatus 100 is connected to the apparatus 1210 including the wireless power transmission circuit 810 described with reference to FIG. 8. Input ports of the electronic apparatus 100 according to the embodiment are connected to USB ports of a general television (TV) 1220. In addition, the wireless power transmission circuit 1210 of the apparatus connected to the electronic apparatus 100 resonates with a wireless power reception circuit provided in a wireless power transmission speaker 1230 as described with reference to FIG. 8. Therefore, the electronic apparatus 100 may wirelessly transmit power to the wireless power transmission speaker 1230 using power supplied from the general TV 1220. Although the input ports of the electronic apparatus 100 are connected to USB ports of a TV 1220 in FIG. 12, according to another embodiment, the input ports of the electronic apparatus 100 may be connected to another electronic device, which has USB connectable ports.

According to an embodiment, the input ports of the electronic apparatus 100 may be connected to different first electronic devices, which has USB connectable ports. According to an embodiment, the electronic apparatus 100 may be connected to a single first electronic device, which has a plurality of USB connectable ports. In this case, the input ports of the electronic apparatus 100 may be connected to one of the plurality of USB connectable ports of the first electronic device or the input ports of the electronic apparatus 100 may be connected to multiple USB connectable ports of the first electronic device.

Figure 13:
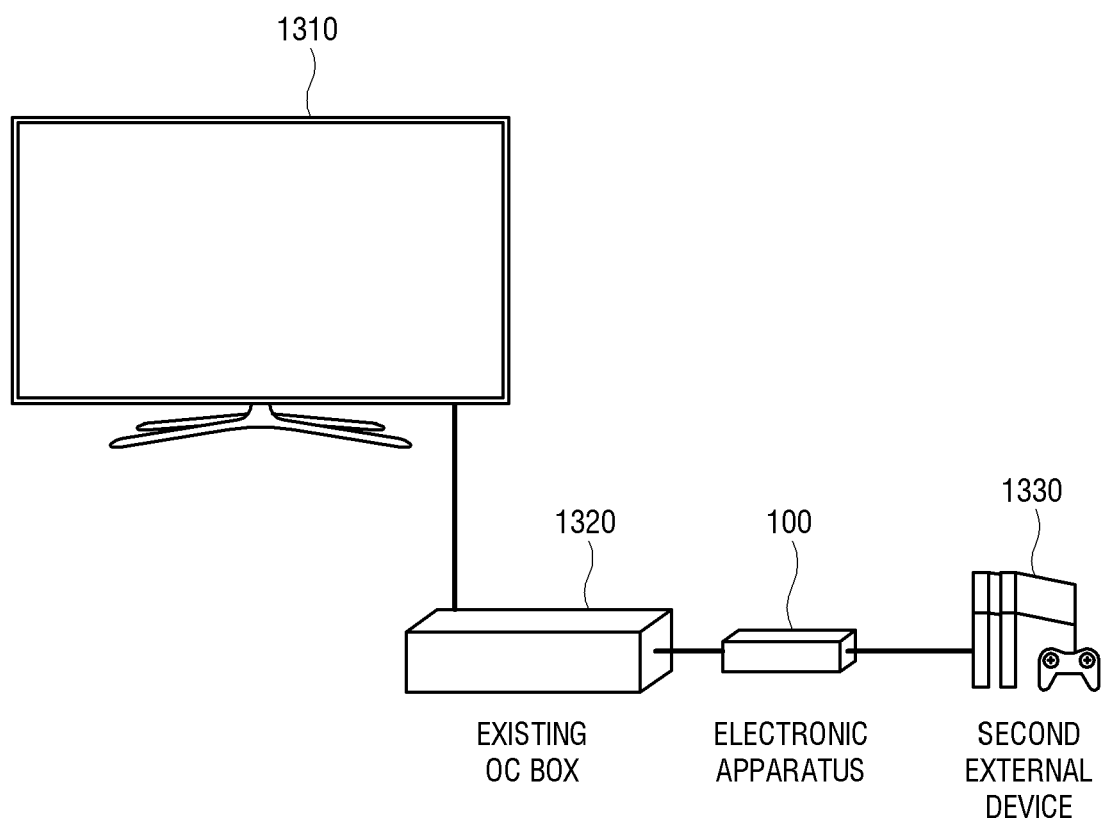
FIG. 13 is a diagram illustrating another actual use example of the electronic apparatus according to an embodiment of the disclosure.

FIG. 13 is a diagram illustrating another actual use example of the electronic apparatus according to an embodiment of the disclosure. As illustrated in FIG. 13, input ports of the electronic apparatus 100 are connected to USB ports provided in an auxiliary device 1320 of a large TV 1310. The auxiliary device 1320 of the embodiment may be a media box outputting a signal to the TV 1310 so that the TV 1310 displays images of various contents. The auxiliary device 1320 is also referred to as an one connect (OC) box in that it is a device connected to the TV 1310 by a single cable such as a transparent cable. The auxiliary device 1320 may include a power supply unit receiving power supplied through a power cable that may be connected to a commercial AC power supply. Therefore, the electronic apparatus 100 may supply power to a second external device 1330 connected to an output port using power supplied from the auxiliary device 1320 connected to the TV 1310.

Figure 14:
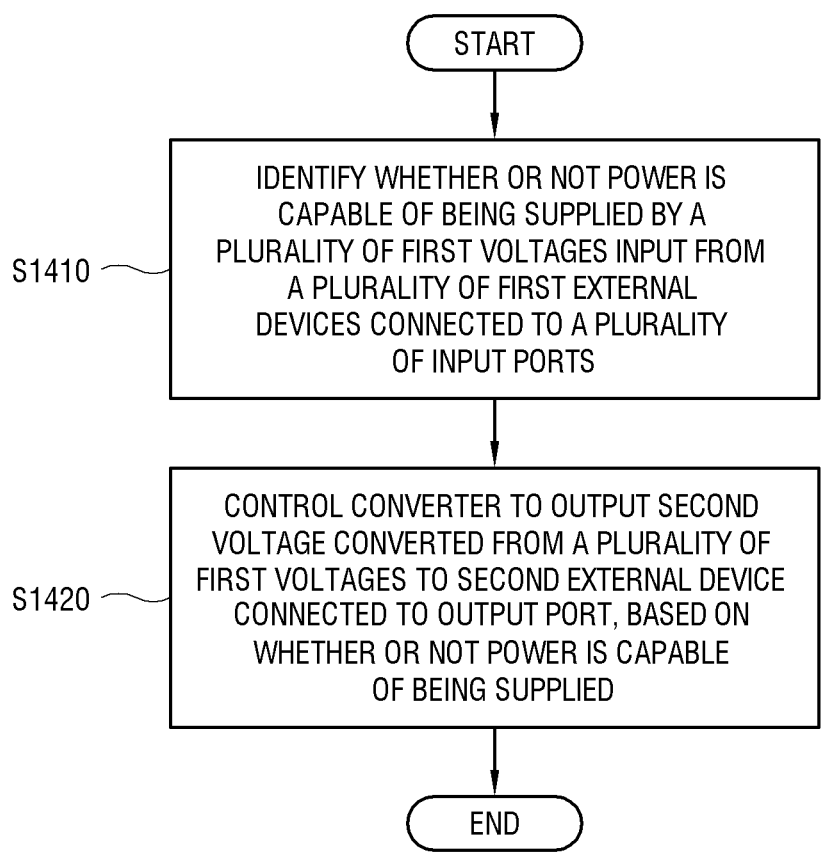
FIG. 14 is a flowchart illustrating a control method of an electronic apparatus according to an embodiment of the disclosure.

FIG. 14 is a flowchart illustrating a control method of an electronic apparatus according to an embodiment of the disclosure.

The processor 140 of the electronic apparatus 100 according to an embodiment of the disclosure identifies whether power is capable of being supplied by input voltages of a plurality of first external devices connected to a plurality of input ports (S1410). In this case, the operation of identifying (S1410) whether the power is capable of being supplied may include identifying a maximum available current of each of the first external devices and identifying whether the power is capable of being supplied based on whether a current supplied from each of the first external devices is lower than the identified maximum available current. Then, the processor 140 controls the converter to output an output voltage converted from a plurality of input voltages to a second external device connected to an output port, based on whether the power is capable of being supplied (S1420).

In operation S1420, the converter 130 according to an embodiment of the disclosure may operate as described above with reference to the description of FIG. 2. The operation of controlling (S1420) the converter 130 according to an embodiment of the disclosure may include controlling sub-converters so that the output voltage reaches a target value by increasing pulse widths of control signals applied to the sub-converters when the output voltage is lower than the target value and performing control to maintain a pulse width of a control signal applied to a sub-converter corresponding to the first external device whose power is expected to exceed maximum available power, among the plurality of sub-converters. In addition, according to another embodiment, the operation of the electronic apparatus 100 described with reference to FIGS. 1 to 13 may be applied to the embodiment illustrated in FIG. 14. According to another embodiment, the operations illustrated in the embodiment of FIG. 14 may be implemented in the electronic apparatus 100 described with reference to FIGS. 1 to 13. According to an embodiment, some or all of operations illustrated in the embodiment of FIG. 14 may be implemented in the electronic apparatus 100 described with reference to FIGS. 1 to 13.

The above-described embodiments may be written as a program that is executable in a computer, and may be implemented in a general purpose digital computer for operating the program by using a computer-readable recording medium. Furthermore, a structure of data used in the above-described embodiments may be recorded through various means on a computer-readable recording medium. The computer-readable recording medium may include storage media such as magnetic storage media, for example, ROM, floppy disks, or hard disks, or optical reading media, for example, CD-ROM or DVD.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims and their equivalents.

The invention claimed is:

1. An electronic apparatus, comprising:
   a plurality of input ports including a first plurality of input ports and a second plurality of input ports, each of the plurality of input ports configured to connect with one or more first external devices;

an output port configured to connect with a second external device;

a converter configured to output an output current to the output port;

an input determination circuit comprising:
- a power input terminal commonly connected to the first plurality of input ports and the second plurality of input ports,
- a plurality of current sensing terminals, each of the plurality of current sensing terminals independently connected to one of the first plurality of input ports or one of the second plurality of input ports,
- a plurality of voltage sensing terminals, each of the plurality of voltage sensing terminals independently connected to one of the first plurality of input ports or one of the second plurality of input ports, and
- a plurality of control signal output terminals, each of the plurality of control signal output terminals corresponding to one of the first plurality of input ports or one of the second plurality of input ports; and a processor configured to:
- identify power required for operating the second external device, and
- control levels of input currents from the first plurality of input ports applied to the converter to output the output current, based on the identified power and based on an output from one or more of the plurality of current sensing terminals of the input determination circuit, wherein the processor is further configured to:
- control a level of at least one of the input currents from the first plurality of input ports such that a sum of the input currents from the first plurality of input ports corresponds to the output current for the identified power, wherein the level of the at least one of the input currents is adjusted within a maximum available current for each of the first plurality of input ports, and
- based on detecting that the levels of all of the input currents from the first plurality reach the maximum available currents for all of the first plurality of input ports, add an input current from at least one of the second plurality of input ports to the input currents applied to the converter, wherein the input determination circuit further comprises:
- a plurality of connecting circuits provided between the plurality of input ports and the power input terminal, the plurality of current sensing terminals, the plurality of voltage sensing terminals and the plurality of control signal output terminals, wherein each of the plurality of connecting circuits comprises:
- a diode connected between the power input terminal and a respective input port, among the plurality of input ports,
- a transistor having a source connected to the respective input port, among the plurality of input ports, and a gate connected to a respective control signal output terminal, among the plurality of control signal output terminals, and
- a resistor connected to a drain terminal of the transistor.

2. The electronic apparatus of claim 1, wherein the processor is further configured to control the converter to change an output voltage to reach a target value by increasing a pulse width of a control signal applied to the converter based on the output voltage being lower than the target value.

3. The electronic apparatus of claim 2, wherein the converter comprises a plurality of sub-converters connected to each other in parallel, each of the plurality of sub-converters corresponding to the plurality of input ports, and
the processor is further configured to perform control to maintain the pulse width of the control signal applied to the converter, if further increasing the pulse width is expected to exceed maximum available power.

4. The electronic apparatus of claim 1, further comprising a display,
wherein the processor is further configured to control the display to display information on at least one of maximum available power of the one or more first external devices connected to the plurality of input ports, required power of the second external device, or outputtable power of the output port.

5. The electronic apparatus of claim 1, wherein the output port comprises a wireless power transmission circuit, and
the processor is further configured to control the wireless power transmission circuit to wirelessly transmit the power to the second external device.

6. The electronic apparatus of claim 1, further comprising a circuit that is provided on the output port and configured to identify a required voltage of the second external device,
wherein the processor is further configured to control the converter to reach an output voltage to the identified required voltage.

7. The electronic apparatus of claim 1, wherein the processor is further configured to identify a magnitude of a plurality of input voltages to be increased based on supply of the power being insufficient, and
further comprising a circuit that requests the one or first external devices to increase one or more of the plurality of input voltages to reach the identified magnitude.

8. The electronic apparatus of claim 1, wherein each of the plurality of input ports is a universe serial bus (USB) port.

9. The electronic apparatus of claim 1, wherein the converter comprises a plurality of sub-converters whose respective input terminals are correspondingly connected to the plurality of input ports and respective output terminals are connected to each other.

10. The electronic apparatus of claim 1, wherein the processor is further configured to identify the maximum available current for each of the plurality of input ports by identifying whether a fluctuation is generated in the respective input voltage.

11. The apparatus according to claim 1, wherein the processor is further configured to identify the maximum available current for each of the plurality of input ports based on rapid drop in the respective input voltage above a threshold value.

12. A method of controlling an electronic apparatus including a plurality of input ports including a first plurality of input ports and a second plurality of input ports, each of the plurality of input ports configured to connect with one or more first external devices, an output port configured to connect with a second external device, a converter configured to output an output current to the output port, and an input determination circuit including a power input terminal commonly connected to the first plurality of input ports and the second plurality of input ports, a plurality of current sensing terminals, each of the plurality of current sensing terminals independently connected to one of the first plurality of input ports or one of the second plurality of input ports, a plurality of voltage sensing terminals, each of the plurality of voltage sensing terminals independently connected to one of the first plurality of input ports or one of the second plurality of input ports, and a plurality of control signal output terminals, each of the plurality of control signal output terminals corresponding to one of the first plurality of input ports or one of the second plurality of input ports, the method comprising:

identifying power required for operating the second external device; and controlling levels of input currents from the first plurality of input ports applied to a converter to output the output current, based on the identified power required for operating the second external device and based on an output from one or more of the plurality of current sensing terminals of the input determination circuit, wherein the controlling the levels of the input currents from the first plurality of input ports comprises:

controlling a level of at least one of the input currents from the first plurality of input ports such that a sum of the input currents from the first plurality of input ports corresponds to the output current for the identified power, wherein the level of the at least one of the input currents is adjusted within a maximum available current for each of the first plurality of input ports, and based on detecting that the levels of all of the input currents from the first plurality of input ports reach the maximum available currents for all of the first plurality of input ports, adding an input current from at least one of the second plurality of input ports to the input currents applied to the converter wherein the input determination circuit further includes: a plurality of connecting circuits provided between the plurality of input ports and the power input terminal, the plurality of current sensing terminals, the plurality of voltage sensing terminals and the plurality of control signal output terminals, wherein each of the plurality of connecting circuits includes: a diode connected between the power input terminal and a respective input port, among the plurality of input ports, a transistor having a source connected to the respective input port, among the plurality of input ports, and a gate connected to a respective control signal output terminal, among the plurality of control signal output terminals, and a resistor connected to a drain terminal of the transistor.

13. The method of claim 12, wherein the converter includes a plurality of sub-converters connected to each other in parallel, each of the plurality of sub-converters corresponding to the plurality of input ports, wherein the controlling further comprises:

controlling the plurality of sub-converters to change an output voltage to reach a target value by increasing a pulse width of a control signal applied to the converter based on the output voltage being lower than the target value; and performing control to maintain the pulse width of the control signal applied to the converter, if further increasing the pulse width is expected to exceed maximum available power.

14. The method of claim 12, further comprising:

displaying information on at least one of maximum available power of the plurality of first external devices connected to the plurality of input ports, required power of the second external device, or outputtable power of the output port.

15. The method of claim 12, wherein the controlling further comprises:

identifying a required voltage of the second external device; and controlling the converter to reach an output voltage to the identified required voltage.

16. The method of claim 12, further comprising:

identifying a magnitude of a plurality of input voltages to be increased based on the supply of the power being insufficient; and requesting the one or first external devices to increase one or more of the plurality of input voltages to reach the identified magnitude.

17. An apparatus comprising:

an input determination circuit comprising:

a power input terminal commonly connected to a plurality of input ports, a plurality of current sensing terminals, each of the plurality of current sensing terminals independently connected to one of the first plurality of input ports, a plurality of voltage sensing terminals, each of the plurality of voltage sensing terminals independently connected to one of the first plurality of input ports, and a plurality of control signal output terminals, each of the plurality of control signal output terminals corresponding to one of the first plurality of input ports;

a memory storing one or more instructions; and a processor configured to:

identify power required for operating a second external device, control, based on the identified power and based on an output from one or more of the plurality of current sensing terminals of the input determination circuit, a level of an input current from at least one of a first plurality of input ports, among the plurality of input ports configured to connect with one or more first external devices, such that a sum of the input currents from the first plurality of input ports corresponds to an output current for the identified power, wherein the level of the at least one of the input currents is adjusted within a maximum available current for each of the first plurality of input ports, and based on detecting that the levels of all of the input currents from the first plurality reach the maximum available currents for all of the first plurality of input ports, add an input current from at least one of a second plurality of input ports, among the plurality of input ports, to the input currents applied to the converter, wherein the input determination circuit further comprises:

a plurality of connecting circuits provided between the plurality of input ports and the power input terminal, the plurality of current sensing terminals, the plurality of voltage sensing terminals and the plurality of control signal output terminals, wherein each of the plurality of connecting circuits comprises:

a diode connected between the power input terminal and a respective input port, among the plurality of input ports, a transistor having a source connected to the respective input port, among the plurality of input ports, and a gate connected to a respective control signal output terminal, among the plurality of control signal output terminals, and a resistor connected to a drain terminal of the transistor.

\* \* \* \* \*